United States Patent [19]

Eguchi et al.

[11] Patent Number: 4,728,186
[45] Date of Patent: Mar. 1, 1988

[54] UNEVEN-SURFACE DATA DETECTION APPARATUS

[75] Inventors: Shin Eguchi, Atsugi; Seigo Igaki, Inagi; Hironori Yahagi, Yokohama; Fumio Yamagishi, Ebina; Hiroyuki Ikeda, Yokohama; Takefumi Inagaki, Kawasaki, all of Japan

[73] Assignee: Fujitsu Limited, Kawasaki, Japan

[21] Appl. No.: 833,276

[22] Filed: Feb. 27, 1986

[30] Foreign Application Priority Data

| Mar. 3, 1985 | [JP] | Japan | 60-041437 |
| Mar. 25, 1985 | [JP] | Japan | 60-059801 |
| Aug. 20, 1985 | [JP] | Japan | 60-181066 |
| Sep. 27, 1985 | [JP] | Japan | 60-212571 |
| Sep. 27, 1985 | [JP] | Japan | 60-212568 |
| Sep. 27, 1985 | [JP] | Japan | 60-212565 |
| Dec. 16, 1985 | [JP] | Japan | 60-282319 |
| Jan. 13, 1986 | [JP] | Japan | 61-004852 |
| Jan. 13, 1986 | [JP] | Japan | 61-004853 |
| Jan. 16, 1986 | [JP] | Japan | 61-006750 |

[51] Int. Cl.$^4$ .............................................. G06K 9/74
[52] U.S. Cl. ................................... 356/71; 356/448
[58] Field of Search .............. 356/71, 448; 382/4

[56] References Cited

U.S. PATENT DOCUMENTS

| 3,716,301 | 2/1973 | Caulfield et al. | 356/71 |
| 3,864,042 | 2/1975 | Leventhal | 356/71 |
| 3,865,488 | 2/1975 | Del Rio | 356/71 |
| 4,428,670 | 1/1984 | Ruell et al. | 356/71 |

OTHER PUBLICATIONS

Opto-Electronics, Nikkan Kogyo Press Co., Japan, pp. 120–125.
Optical Holography, Academic Press, pp. 18–23.

Primary Examiner—R. A. Rosenberger
Assistant Examiner—Crystal D. Cooper
Attorney, Agent, or Firm—Staas & Halsey

[57] ABSTRACT

An uneven-surface data detection apparatus, includes a transparent plate having an uneven-surface contact portion against which an uneven surface to be detected is pressed. A light source illuminates the uneven-surface contact portion through the transparent plate. An uneven-surface image drawing out optical element draws out the light reflected on the uneven-surface contact portion of the transparent plate. A detector detects the light drawn out from the transparent plate by the optical element.

Light reflected by a projection-facing portion of the uneven surface contact portion to be introduced into the detector diverges from a propagation direction of light reflected by a recess-facing portion of the uneven surface contact portion. The optical element is arranged to guide the light reflected by the projection-facing portion into the detector.

33 Claims, 46 Drawing Figures

Fig. 11
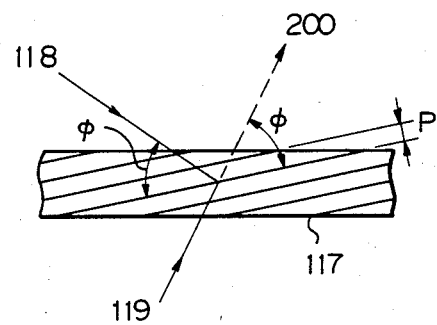
Fig. 12
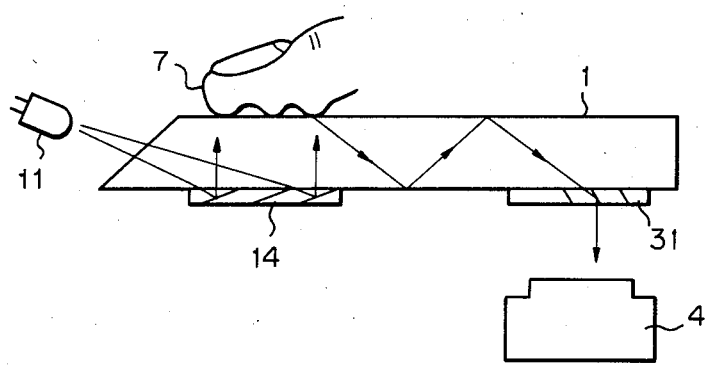
Fig. 13(a)    Fig. 13(b)
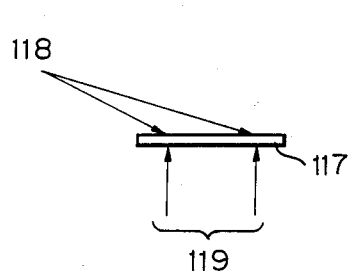 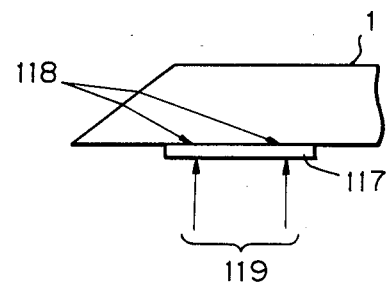

Fig. 26(b)  Fig. 26(a)
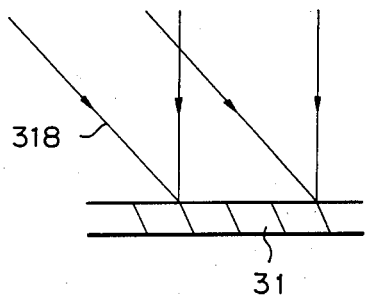
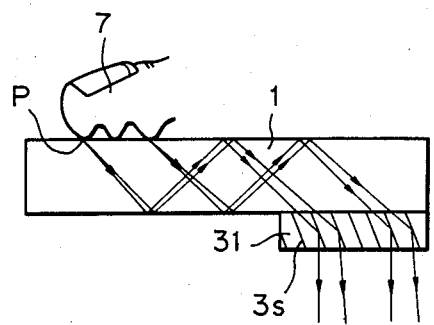
Fig. 27
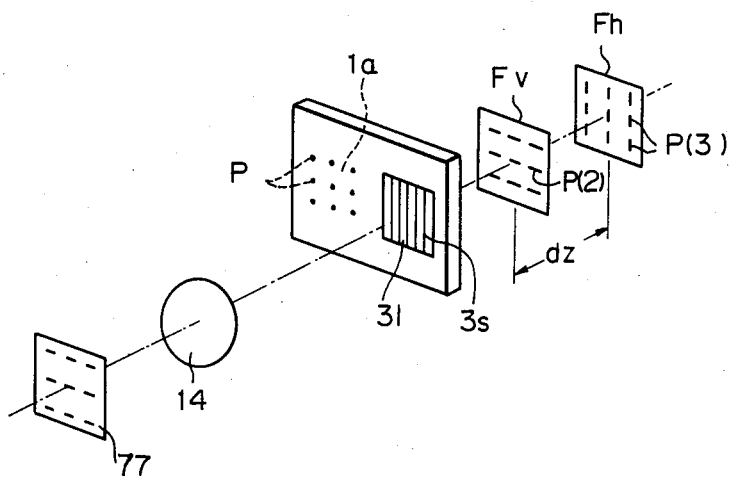

Fig. 28
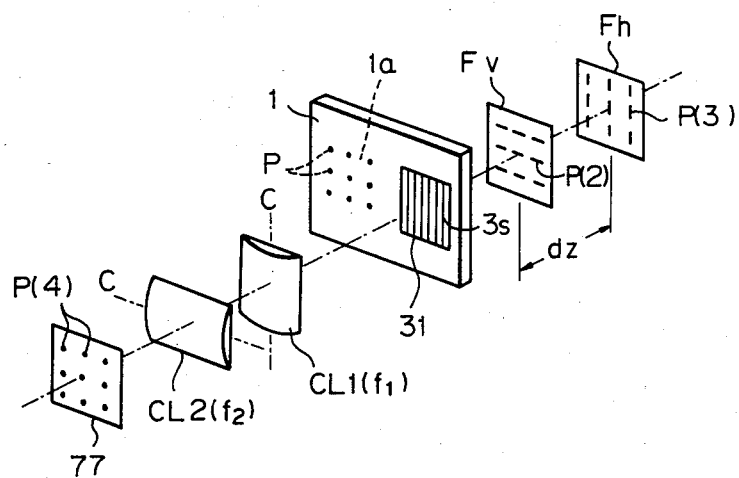
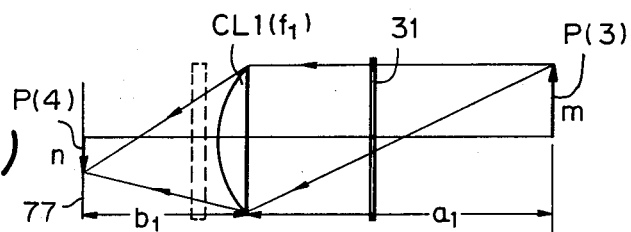
Fig.29(a)
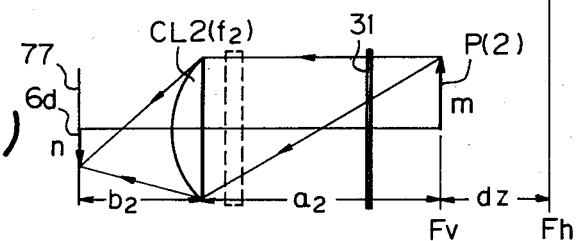
Fig.29(b)

UNEVEN-SURFACE DATA DETECTION APPARATUS

BACKGROUND OF THE INVENTION

(1) Field of the Invention

The present invention relates to an uneven-surface detection apparatus for detecting fingerprints and the like in a personal identification apparatus.

(2) Description of the Related Art

In the high-tech information world of today, a strong demand has recently arisen for better computer system security techniques. In particular, in order to protect data confidentially a reliable identification must be made of personnel in charge of such systems, and thus strict checks on entrance to a computer room have become very important. In the past, passwords and ID cards have been used and now personal identification systems using fingerprints are in increasing use.

In a first conventional method for inputting uneven-surface data (e.g., fingerprint), a fingerprint is printed on paper using ink and is then sensed using an image sensor. In a second method, a light beam is incident on a glass/air interface at a critical angle or larger, and an uneven-surface pattern is thus instantaneously obtained.

In the first method, a finger must be stained with ink each time the fingerprint data is to be input, and an uneven coating or blurring of the ink makes the input operation difficult.

In the second method an uneven-surface data detection apparatus uses a prism, a finger surface (uneven-surface pattern having projections (convexes) and recesses (concaves)) is pressed against an oblique side portion of the prism, and illuminated light is incident on the oblique side portion thereof at a critical angle or larger. The incident light is scattered by projections and is totally reflected by the glass/air interface in recesses. The light is then incident on a detector (e.g., an imaging element), thereby allowing detection of the uneven-surface pattern.

However, light leaks through the unclean oblique surface due to remaining fingerprints or moisture. This leakage light irradiates the concave portion of the fingerprint and is scattered. Therefore, the level of signal light from the convex portion is lowered, degrading the contrast of the uneven-surface pattern. Since a prism is used, the total thickness of the apparatus cannot be reduced. More specifically, if the uneven-surface pattern of the entire palm is to be detected, a large prism must be used, resulting in a bulky apparatus. In addition, the resultant image may be distorted to a trapezoid shape due to a differenced in the optical path length from the surface of the palm to the detector.

SUMMARY OF THE INVENTION

The present invention has been made in consideration of the conventional drawbacks, and has as its object the provision of a thin, compact uneven-surface data detection apparatus in which the contrast of an uneven-surface pattern is improved and a detected image pattern is free from distortion.

In order to achieve the above object, there is provided an uneven-surface data detection apparatus, comprising at least a transparent plate having an uneven-surface contact portion against which an uneven surface to be detected is pressed. A light source illuminates the uneven-surface contact portion through the transparent plate and an uneven-surface image drawing out optical element draws out the light reflected on the uneven-surface contact portion from the transparent plate. A detector detects the light drawn out from the transparent plate by the optical element, wherein light reflected by a projection-facing portion of the uneven surface contact portion to be introduced into the detector is diverged from a propagation direction of light reflected by a recess-facing portion of the uneven surface contact portion, and the optical element is arranged to guide the light reflected by the projection-facing portion into the detector.

BRIEF DESCRIPTION OF THE DRAWINGS

FIG. 11 is a diagram of a Lippmann hologram employed in the embodiment shown in FIG. 10;

FIG. 12 is a diagram of an arrangement according to still another embodiment of the present invention;

FIGS. 13(a) and 13(b) are diagrams of a Lippmann hologram employed in the embodiment shown in FIG. 12;

FIGS. 26(a) and 26(b) are diagrams of a hologram and which reconstructs an image in the uneven-surface data detection apparatus of the present invention;

FIG. 27 is a diagram showing causes of aberrations in the uneven-surface detection apparatus;

FIG. 28 is a diagram of an arrangement according to still another embodiment of the present invention;

FIGS. 29(a) and 29(b) are diagrams of the focal point correction system of the embodiment shown in FIG. 28;

DESCRIPTION OF THE PREFERRED EMBODIMENTS

Figure 1:
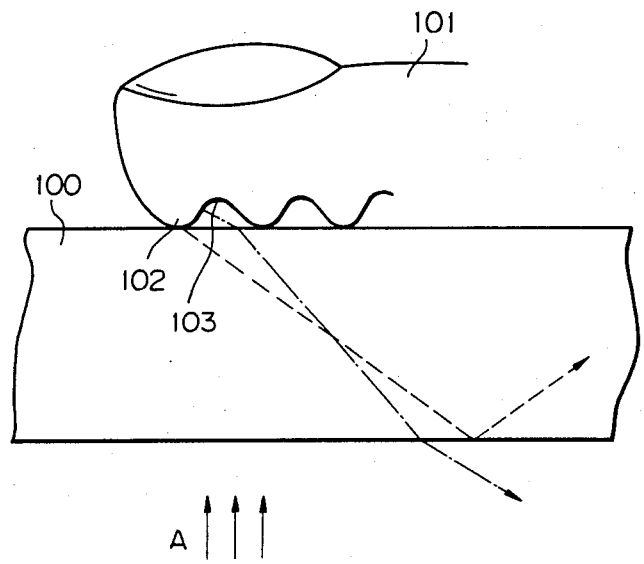
FIG. 1 is a diagram of the present invention.

A basic principle of an uneven-surface data detection apparatus according to the present invention will now be described with reference to FIG. 1. A human finger 101 is pressed against a transparent base 100 (e.g., glass). In FIG. 1, projections (i.e., convex portions) 102 and recesses (i.e. concave portions) 103, which form a fingerprint of the finger 101, are emphasized. As can be seen from the drawing, the convex portion 102 is in contact with the glass surface, while the concave portion 103 is separated from the glass surface so that an air layer is formed between the concave portion 103 and the glass surface. Light is vertically radiated onto the transparent base 100 from the lower surface, as indicated by arrows A. Light entering the interior of the base 100 is randomly reflected by the convex portions 102, and is thereby scattered in all directions, since no air layer is formed at the convex portion. Scattered light beams which satisfy the total reflection condition of the base 100 (i.e., have an angle larger than a critical angle) are totally reflected by the lower surface of the base 100, as indicated by the dashed line in FIG. 1, and are then totally reflected by the upper surface thereof (although not illustrated in FIG. 1). Thus, these light beams are transmitted through the interior of the base 100. On the other hand, light passes through the base 100 at the concave portion 103, since an air layer is formed at this portion. The light beam which passes through the base 100 and reaches a convex portions 103 of finger 101 is randomly reflected by the surface at the recess 103, and is converted into a scattered light beam. When this scattered light beam enters the base 100 from the upper surface thereof, it is externally emitted from the lower surface of the base 100 at the same angle as the incident angle, in accordance with Snell's law (as indicated by the long-dash-short-dash line). Therefore, no scattered light from the convex portions 103 is transmitted through the interior of the base 100. In this way, only the totally reflected light transmitted through the interior of the base 100 is detected to obtain an uneven-surface pattern image.

Figure 2:
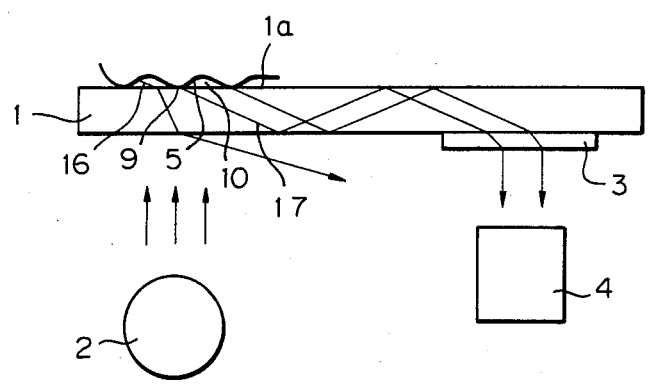
FIG. 2 is a side view of an uneven-surface data detection apparatus according to the present invention.

FIG. 2 is a side view of the uneven-surface data detection apparatus according to the present invention. Reference numeral 1 denotes a transparent plate. The plate 1 has an uneven-surface contact portion 1a, against which an uneven surface (e.g., a fingerprint) 5 is pressed. A light source 2 for illuminating the uneven surface 5 is arranged below the plate 1. At the other end of the portion 1a, an optical element 3 for externally guiding totally reflected light in the plate 1 is disposed, and a detector 4 is directly opposed to the optical element for detecting the light guided by the optical element 3.

It should be noted that the transparent plate 1 need only be transparent with respect to light emitted from the light source used.

When the uneven surface 5 is pressed against the transparent plate 1 and is illuminated with the light source 2, light components reflected by a projection 9 and those reflected by a recess 10 of the uneven surface 5 propagate in different directions, respectively. More specifically, light components 16 scattered by the recess 10 enter the plate 1, are refracted, and are then discharged outside the plate 1. On the other hand, light components 17 scattered by the projection 9 and having an angle larger than a critical angle are totally, repetitively reflected at the transparent plate/air interfaces and propagate through the interior of the plate 1 (note, other light components 17 having an angle less than the critical angle are discharged outside the plate 1). The convex data and the concave data are discriminated depending on whether or not the air layer is formed between the plate and the finger. Since all the light components 16 scattered by the recess 10 are discharged outside the plate 1, the light components 17 propagating through the interior of the plate 1 correspond to data from the projection 9 and need be detected only to obtain uneven-surface pattern data having a good contrast.

When the light components 17 propagate through the interior of the plate 1 and reach a position corresponding to the optical element 3, since the total reflection condition can no longer be satisfied, the light components 17 enter the optical element 3 through an interface between the plate 1 and the element 3, and are guided externally therefrom. The pattern data from the light components 17 of the projection 9 is then detected by the external detector 4.

Figure 3:
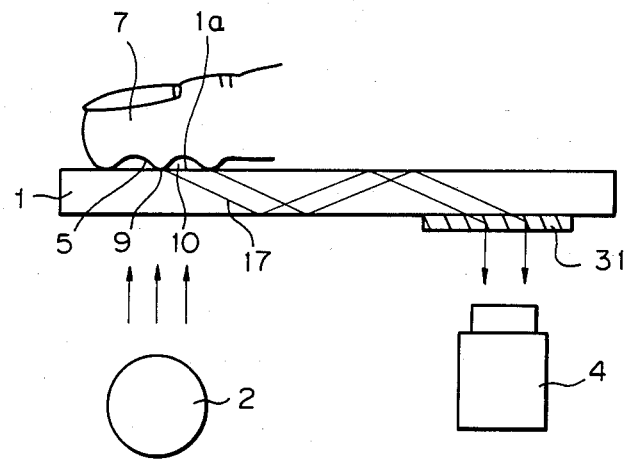
FIG. 3 is a side view of an embodiment of the present invention.
Figure 4:
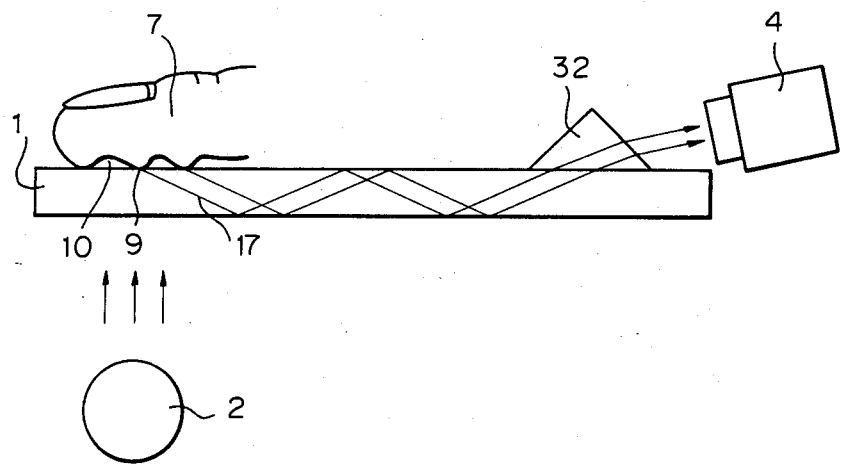
FIG. 4 is a side view of another embodiment of the present invention.

An application of the uneven-surface data detection apparatus of this invention will now be described. FIGS. 3 and 4 are side views of different embodiments of the present invention. A transparent plate 1 can be made of either glass or plastic. In order to externally guide the totally reflected light through the interior of the plate 1, a hologram or a prism which does not satisfy the total reflection condition is preferred.

In FIG. 3, a hologram 31 is used as an optical element. More specifically, the hologram 31 is mounted on an uneven-surface contact portion 1a of a transparent plate 1 at a position at which it does not interfere with the pressing operation of an uneven surface 5 thereon. With this arrangement, totally reflected light propagating through the interior of the plate 1 enters the hologram 31, is diffracted thereby, is discharged externally, and is detected by a detector 4.

FIG. 4 is an embodiment wherein a prism 32 is provided instead of the hologram 31. The total reflection condition of light components 17 is disturbed by an interface between the prism 32 and the air. Then, the light components 17 are diffracted into the prism 32 and are guided externally. In this embodiment, however, optical path lengths of the light components propagating through the prism 32 are different, and trapezoidal distortion may occur. If a hologram is used, since all the optical path lengths are the same, trapezoidal distortion cannot occur. Note that if a hologram having a lens function is used, a resultant image can be directly formed on a sensor (e.g., a CCD).

According to the present invention as described above, all the light components scattered by a recess are discharged outside the transparent plate, and only those scattered by the projection propagate through the interior of the transparent plate. Therefore, only the projection data can be extracted, and as a result, uneven-surface pattern data with a good contrast can be obtained. In particular, the optical system need include only a transparent plate, even when a large uneven surface is to be detected. Thus, an increase in the size of the detection apparatus can be prevented.

Figure 5:
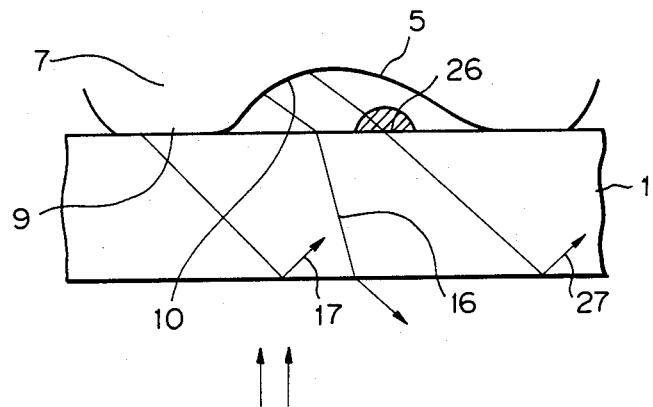
FIG. 5 is a diagram of the influence of a residual lipidic component on a transparent base.

In the above-mentioned apparatus, when a residual lipidic or aqueous component 26 from a residual fingerprint is attached to the surface of the plate 1 and is in contact with a finger 7, as shown in FIG. 5, it is illuminated with the scattered light from a recess of the finger 7 and acts as a secondary light source. The scattered light from the component 26 then propagates through the plate 1 as noise light 27, thus degrading a S/N ratio.

Figure 7:
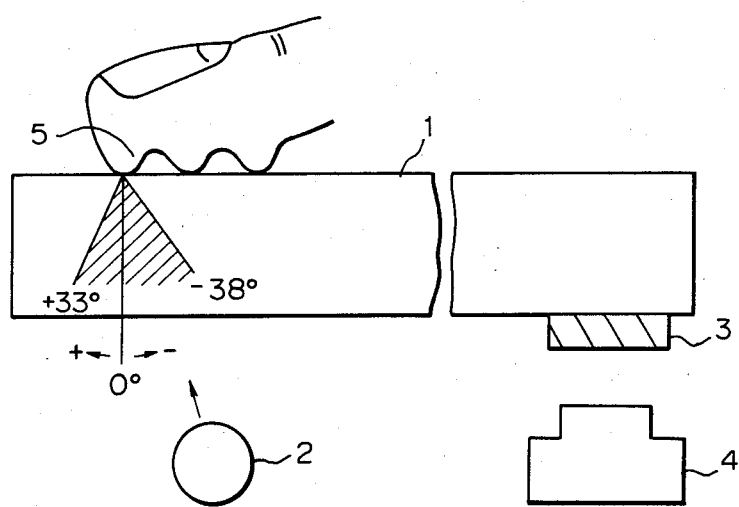
FIG. 7 is a diagram of an arrangement of still another embodiment of the present invention.

For this reason, according to another embodiment of the present invention shown in FIG. 7, an uneven-surface data detection apparatus comprises a transparent plate 1 against which an uneven surface 5 to be detected is pressed, a light source 2 for illuminating the uneven surface 5, an optical element 3 for externally guiding light totally reflected through the plate 1 by disturbing the total reflection condition, and an imaging device (detector) 4 for detecting the externally guided light. In this apparatus, assume that when a direction from the surface 5 toward the optical element 3 is given by "−" and a direction opposite thereto is given as "+", a direction of light for illuminating the uneven surface 5 is set to fall within the range of ×33° to −38°.

Since a light illumination angle with respect to the surface 5 falls within the range of +33° to −38°, an amount of light which is reflected from a recess of the surface 5 and propagates toward the optical element 3 can be reduced. In addition, an influence due to a residual fingerprint can be eliminated, thus preventing degradation in the S/N ratio.

Figure 6:
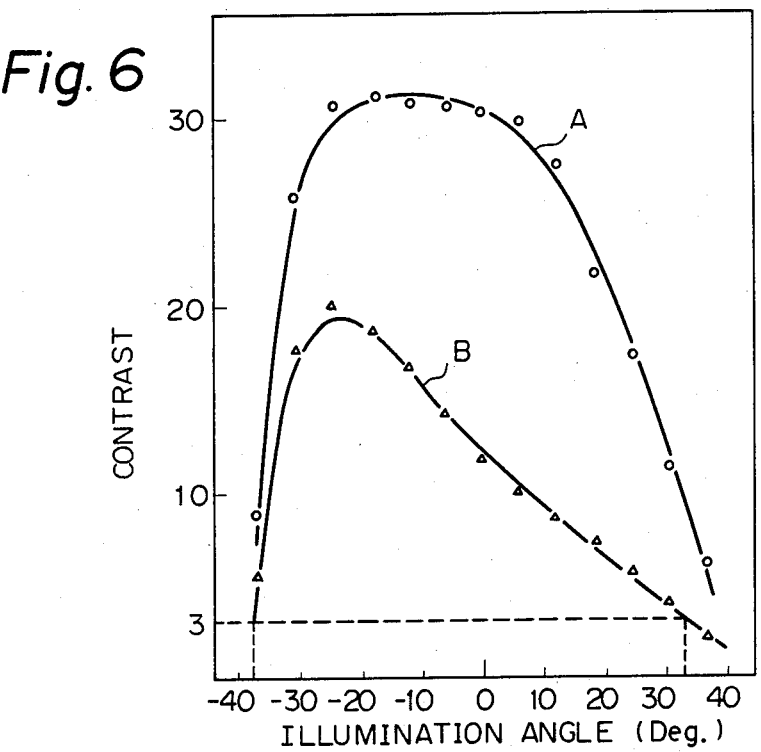
FIG. 6 is a graph of the dependency of contrast with respect to an illumination angle.

FIG. 6 is a graph of the experimentally obtained results of the dependency of the contrast on the illumination angle. Referring to FIG. 6, the illumination angle (of light illuminating the uneven surface from the interior of the transparent plate) is plotted along the abscissa, and the contrast of the obtained image data is plotted along the ordinate. In addition, curve A indicates a case wherein a fingerprint is detected when the transparent plate is clean, and a curve B indicates a case wherein a fingerprint is detected when a residual fingerprint is left on the transparent plate. As can be seen from FIG. 6, when the residual fingerprint remains, the illumination angle dependency of the contrast is enhanced. In this case, in order to obtain a contrast of 3 or more, the illumination angle range must fall within +33° to −38°.

In this embodiment, even if a lipidic or aqueous component becomes attached to the transparent plate, a good contrast can be obtained. Note that, in the apparatus of FIG. 3 or 4, if the influence of a residual fingerprint is present, a load may be applied to a verification algorithm and a verification rate may be degraded. However, such problems are obviated in the above-mentioned embodiment.

According to the apparatus of the above-mentioned embodiment, even if a lipidic or aqueous component caused by a residual fingerprint becomes attached to the transparent plate, a high contrast image can be obtained, thus providing great practical advantages.

In the uneven-surface data detection method of FIG. 3 or 4, astigmatism caused by a difference between a formation wavefront and a reconstruction wavefront of a hologram can be generated, thus blurring the image.

Figure 9:
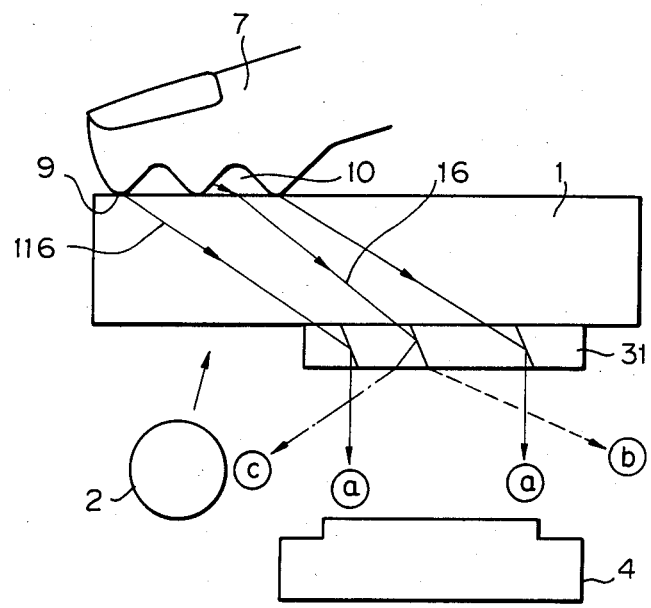
FIG. 9 is a diagram of an arrangement according to still another embodiment of the present invention.

For this reason, in another embodiment of the present invention shown in FIG. 9, an uneven-surface data detection apparatus comprises a transparent plate 1, a light source 2, a hologram 31, and a detector 4. In this apparatus, light components scattered by an uneven object (finger) 7 pressed against the plate 1 are guided directly into the hologram 31, and only projection data, corresponding to light components 116 from a projection 9 of the object 7 which satisfy the Bragg condition of the hologram, is guided into the detector 4. Light components from a recess 10 of the object 7 and other light components from the projection 9 not satisfying the Bragg condition are not guided to the detector 4, thus obtaining uneven-surface data from only the projection data.

When a distance between the hologram and an object to be detected is shortened in a hologram reconstruction mode (i.e., in a detection mode), aberration due to a difference between the formation wavefront and the reconstruction wavefront of the hologram, and a difference in a height/width ratio of an image, can be eliminated.

Figure 8:
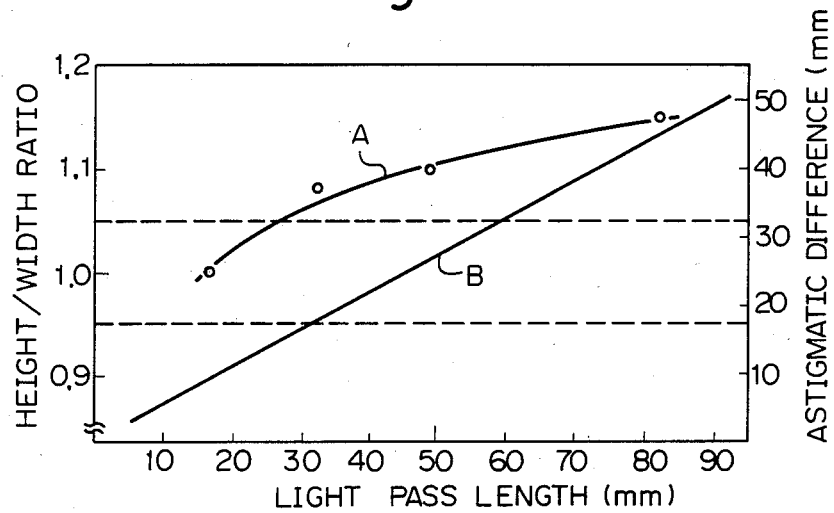
FIG. 8 is a graph of the relationship between an optical path length, a height/width ratio of an obtained image, and an astigmatic difference.

FIG. 8 is a graph of the relationship between an optical path length, a height/width ratio of a resultant image, and an astigmatic difference. Referring to FIG. 8, the optical path length is plotted along the abscissa, the height/width ratio is plotted along the left ordinate, and the astigmatic difference is plotted along the right ordinate. In addition, curve A indicates the height/width ratio, and a curve B indicates the astigmatic difference.

Note that the height/width ratio is a ratio of height and width of longitudinal and lateral focal points of an imaging beam when viewed from a certain point. As shown in FIG. 8, as the ratio approaches 1.0, the beam becomes better focused. The astigmatic difference is the distance between maximum distortion portions of a beam in both the longitudinal and lateral directions. As the astigmatic difference becomes smaller, aberration can be eliminated and the beam can be better focused. As can be seen from FIG. 8, the astigmatic difference becomes smaller as the optical path length is shortened. Dotted lines in FIG. 8 represent an allowable range of a height/width ratio error. When the allowable range is 5%, the optical path length is preferably set to be 27 mm or less.

With the arrangement satisfying this condition shown in FIG. 9, light components 116 which are reflected from the projection 9 of the object 7 and satisfy the Bragg condition are diffracted by the hologram 31, and reach the detector 4, as indicated by a. However, not all of the light components 16 from the recess 10 can satisfy the Bragg condition, and are discharged into an air layer on the basis of Snell's law, as indicated by b. Although the components 16 are partially diffracted, as indicated by c, since they are weak and do not satisfy the Bragg condition, they propagate in a different direction. Therefore, only the projection data light is detected and a fingerprint image is obtained.

When an optical path length is set to be about 17 mm according to the total reflection filtering method of the embodiment shown in FIG. 3, if an effective angle of scattered light from the object is set at 45° and projection data is discriminated from the recess data after total reflection, the thickness of the transparent plate must be set to be about 6 mm, and a detected image overlaps the actual object. Therefore, it is impossible to obtain an image.

According to the embodiment described above, a clear image with less astigmatic difference can be obtained by a simple method. In addition, since the obtained image has no distortion, no correction means is required and verification can be easily performed, thus providing great practical advantages.

In the embodiment of FIG. 3, since the hologram 31 is used for drawing out the image data (reflection light) from the transparent plate, if a light source having a wide wavelength band is used, a resultant image may be blurred. Therefore, for example, a laser device whose wavelength range is not wide must be used, thus increasing the total cost. For this reason, according to still another embodiment of the present invention shown in FIG. 10, a plate-like fingerprint sensor comprises a transparent plate 1, a light source 11, an image drawing out hologram 31, and a detector 4 which detects a fingerprint in accordance with the total reflection filtering method. In this apparatus, an LED 11 is used for the light source, and a Lippmann hologram 14 is used for guiding the light from the light source to a finger contact portion.

Since the Lippmann hologram 14 is used between the light source 11 and the object 7 (i.e., the finger surface), even if the light source comprises the LED having a wavelength bandwidth, a certain wavelength can be selected in conjunction with the wavelength selectivity of the Lippmann hologram, and a clear image can be obtained.

Figure 10:
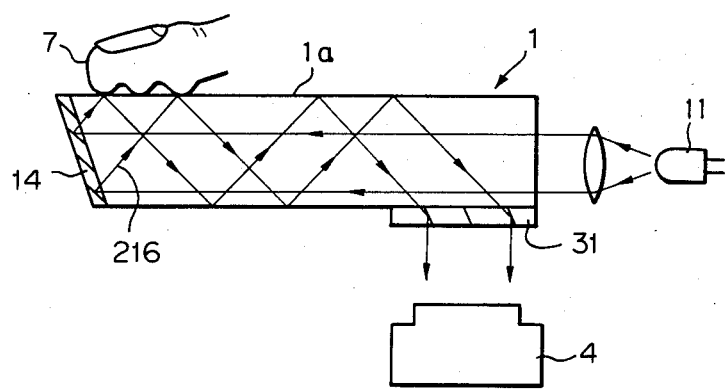
FIG. 10 is a diagram of an arrangement according to still another embodiment of the present invention.

In this embodiment, as shown in FIG. 10, the Lippmann hologram 14 is formed at an end face of the transparent plate 1, near a portion against which the finger 7 to be detected is pressed, and the LED 11 is arranged at the side of the opposing end face thereof, and light is emitted therefrom. The image drawing out hologram 31 and the detector 4 are arranged in the same manner as in the above embodiments. Note that light components 216 diffracted by the Lippmann hologram 14 are preferably incident on an air interface 1a of the plate 1, at an angle smaller than the critical angle, so as not to be totally reflected. The Lippmann hologram 14 can be formed as shown in FIG. 11, such that a hologram photographic plate 117 is irradiated with a reference wave 118 on the front surface and with an object wave 119 on the back surface thereof. When a reconstruction wave is radiated from the direction of the reference wave 118, a reflection wave 200 is emitted in a direction which satisfies a relationship $\lambda = 2P \sin \phi$ (where $\lambda$ is a wavelength, P is a pitch of interference fringes, and $\phi$ is an angle of incident light with respect to the fringes).

With this arrangement, light from the LED 11 having a wide wavelength band is filtered to have a certain wavelength by the wavelength selectivity of the Lippmann hologram 14, and is then detected by the detect 4, thus obtaining a clear fingerprint image. Note that the operation of this embodiment is the same as the above embodiments, and a detailed description thereof is omitted.

FIG. 12 is another embodiment of the present invention. The same referene numerals in FIG. 12 denote the same parts as in FIG. 10.

In this embodiment, an end face of a transparent plate 1 near a finger contact portion is cut obliquely, and a Lippmann hologram 14 is formed on the surface opposite to the finger contact portion. In addition, an LED 11 is arranged so that its light is incident on the obliquely cut end face. An image drawing out hologram 31 and a detector 4 are arranged, as in the above embodiments. The Lippmann hologram 14 used in this embodiment can be prepared as shown in FIGS. 13(a) and 13(b) such that a photographic plate 117 is irradiated with a reference wave 118 on the front surface and with an object wave 119 on the back surface thereof. In this case, the object wave 119 incident from the back surface need not be strictly a parallel beam, but can have a divergence angle which does not exceed a critical angle of the plate 1 in the reconstruction mode, so as not to emit stray light with respect to the read hologram 31.

The operation and effect of this embodiment is the same as the embodiment of FIG. 10.

According to the present invention as described above, an inexpensive LED can be used for the light source, and the total cost of the fingerprint sensor can be reduced, thus providing practical advantages.

Figure 14:
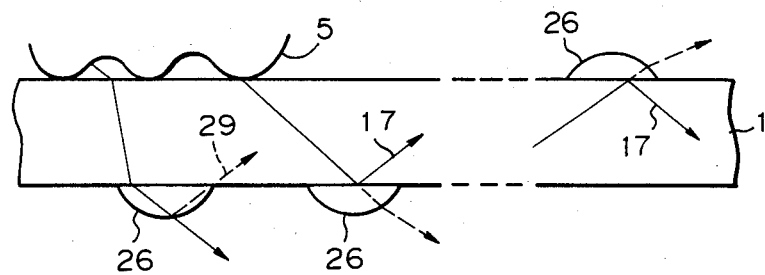
FIG. 14 is a diagram of the influence of a residual lipidic component on a transparent base.

In the apparatus shown in FIG. 3 or 4, when a lipidic or aqueous component 26 from a finger becomes attached to the transparent plate 1, as shown in FIG. 14, optical noise 29 is increased, and signal light 17 is reduced, thus degrading the S/N ratio.

Figure 15:
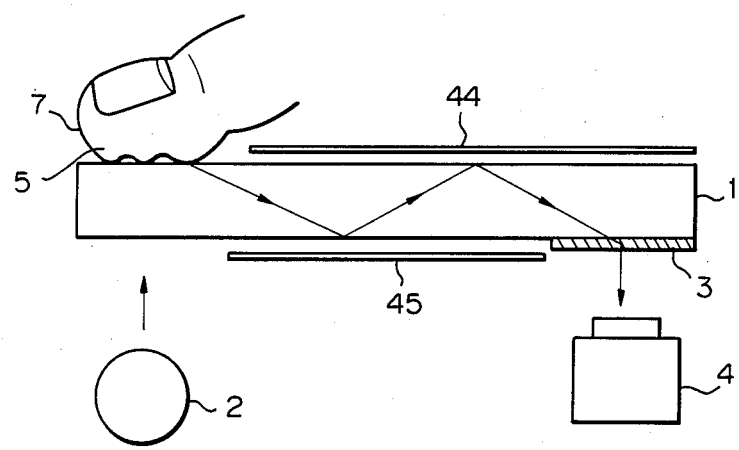
FIG. 15 is a diagram of an arrangement according to still another embodiment of the present invention.

For this reason, according to still another embodiment of the present invention shown in FIG. 15, an uneven-surface data detection apparatus comprises a transparent plate 1 against which an uneven surface 5 of an object 7 to be detected is pressed, a light source 2 for illuminating the uneven surface 5, an optical element 3 for externally guiding light which is totally reflected through the interior of the plate 1, and a detector 4 for detecting the externally guided light. In this apparatus, dust covers 44 and 45 are arranged on air layers on one or both of the upper and lower surfaces of the plate 1.

Since the dust covers 44 and 45 are provided on the transparent plate through the air layer, a lipidic or aqueous component cannot become attached to the transparent plate, thus preventing the S/N ratio from being impaired. Since the air layers are sandwiched between the dust covers 44 and 45 and the transparent plate 1, the dust covers 44 and 45 will not adversely influence the total reflection condition of light propagating through the interior of the transparent plate 1.

According to the present invention as described above, degradation of the S/N ratio of the apparatus can be prevented by a very simple arrangement, and is effective for practical use.

In the above embodiments, when an object to be detected is an embossed pattern or a seal instead of a human finger, since the embossed pattern or seal is not flexible, only a portion of a projection thereof will be in tight contact with the transparent plate when it is pressed thereon. Thus, an air layer is interposed between the other portion of the projection and the transparent plate, and an image thereof becomes blurred.

Figure 16:
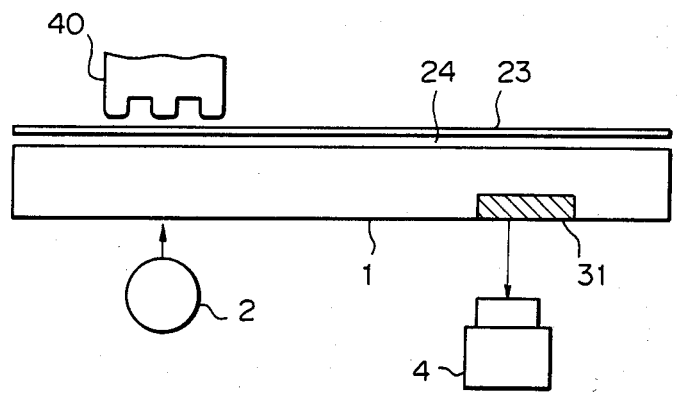
FIG. 16 is a diagram of an arrangement according to still another embodiment of the present invention.
Figure 17:
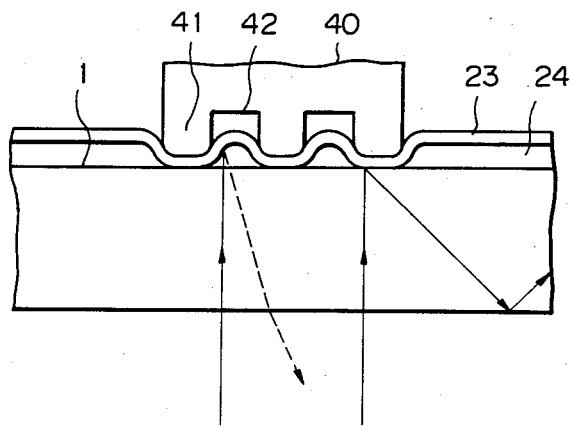
FIG. 17 is a diagram of the operation of the embodiment shown in FIG. 16.

FIGS. 16 and 17 are other embodiments of the present invention, in which FIG. 16 is an an arrangement of an uneven-surface data detection apparatus, and FIG. 17 shows the operation of the device in FIG. 16. The same reference numerals in FIGs. 16 and 17 denote the same parts.

The above problem can be solved by an uneven-surface data detection apparatus of the present invention comprising a transparent plate 1 having an elastic film 23 interposed between itself and an object 40, for transmitting light reflected from a projection of the object 40 pressed thereon through the elastic film 23; an optical element 31, for externally guiding light reflected from the projection of the object 40 and propagating through the plate 1; a light source 2 for illuminating the object 40 through the plate 1; and an imaging element (detector) 4 for converting an optical image guided outside the plate 1 by the optical element 31 into an electrical signal.

When the elastic film 23 is interposed between the object 40 (e.g., an embossed pattern or a seal) and the transparent plate 1 in FIG. 16, an air layer interposed between the projection of the object 40 and the transparent plate 1 is filled by the elastic film 23, as shown in FIG. 17. As a result, an optical image of a rigid pattern having good contrast can be obtained and converted directly into an electrical signal with high precision, just as in the fingerprint sensors in the above embodiments and can be immediately verified with a pre-registered content. However, a small air layer is present between a recess 42 of the object 40 and the plate 1. Light which is emitted from the light source 2 and reaches the recess 42 is scattered by the film 23 below the recess 42, enters the plate 1, and is discharged into a lower air layer in accordance with Snell's law.

Light which is incident on the surface of the film 23 in contact with the projection 41 is scattered at the contact interface. Although part of the scattered light is discharged from the lower surface of the plate 1 into the air layer, the remaining part thereof, which enters an interface between the air layer and the lower surface of the plate 1 at an angle larger than the critical angle, is totally reflected thereupon, propagates through the interior of the plate 1, and is then externally guided by the hologram diffraction grating 31. An optical image externally guided by the grating 31 and formed only by the light from the projections 41 is sensed by the imaging element 4, and is converted into an electrical signal to be output from the apparatus.

Figure 18:
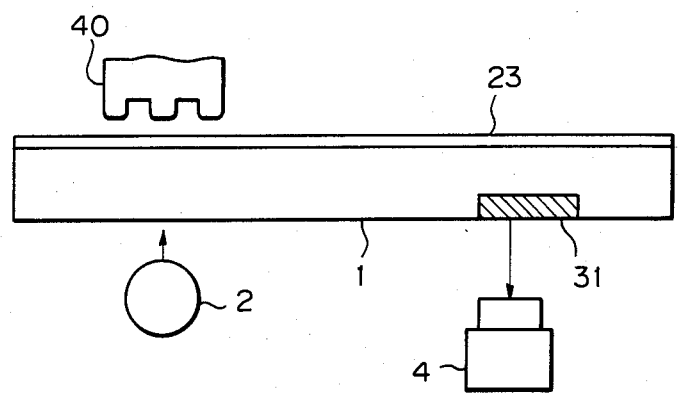
FIG. 18 is a diagram of an arrangement according to still another embodiment of the present invention.

An uneven-surface data detection apparatus according to still another embodiment of the present invention will now be described with reference to FIGS. 18 and 19, in which FIG. 18 is another embodiment, and FIG. 19 explains the operation of the device in FIG. 18.

Referring to FIG. 18, the apparatus comprises a transparent plate 1 having an optical element (e.g., a hologram diffraction grating) 31; a very thin elastic film 23 interposed between a rigid object 40 (e.g., an embossed pattern or a seal) and the plate 1; a light source 2 for illuminating the object 40 through the plate 1; and an imaging element 4 for converting an optical image externally guided by the optical element (hologram) 31 into an electrical signal. The elastic film 23 is formed by a resin (e.g., silicone resin) having a refractive index approximately to that of the plate 1, and is in tight contact with the plate 1.

Figure 19:
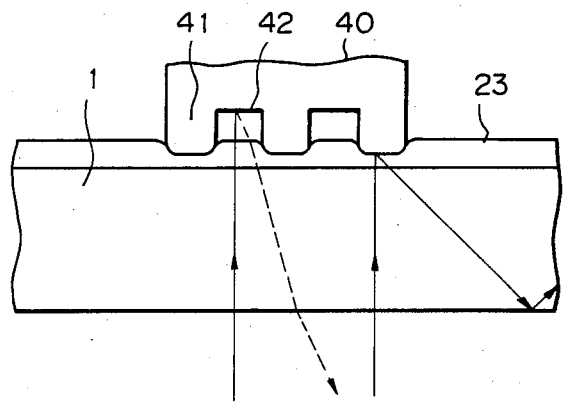
FIG. 19 is a diagram of the operation of the embodiment shown in FIG. 18.

Referring to FIG. 19, when the object 40 having an uneven surface is pressed against the plate 1 at a proper pressure, a projection 41 of the object 40 is pressed in the elastic film 23, with a small air layer remaining between a recess 42 of the object 40 and the film 23. Light from the light source 2, which reaches the recess 42 through the plate 1 and the film 23, is scattered by the recess 42. After re-entering the plate 1, the scattered light is discharged into an air layer below the plate 1 in accordance with Snell's law.

On the other hand, light which reaches the projection 41 is scattered at the contact interface. Although part of the light is discharged into the air layer below the plate 1, the remaining part thereof, which enters an interface between the lower surface of the plate 1 and the air layer at an angle larger than the critical angle, is totally reflected. This reflected light propagates through the interior of the plate 1, and is then externally guided by the grating 31. An optical image, externally guided by the grating 31 and formed only by the light from the projections 41, is sensed by the imaging element 4 and is converted into the electrical signal to be output from the apparatus.

Figure 20:
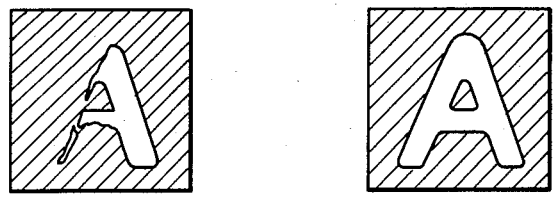
FIGS. 20(a) and 20(b) are diagrams of a detected seal pattern.

FIGS. 20(a) and 20(b) are a seal pattern detected by the apparatus of the present invention.

When an uneven surface of a seal is detected by the apparatus of the embodiments shown in FIGS. 3 to 15, almost all of the pattern is blurred, as shown in FIG. 20(a), and cannot be used for personal verification. In contrast to this, a seal pattern detected by the apparatus of the embodiment shown in FIGS. 16-19 is very clear, as shown in FIG. 20(b), and can be reliably used for personal verification.

More specifically, since an elastic film is interposed between the rigid object (e.g., the embossed pattern or seal) and the transparent plate, an air layer present between a projection of the object and the transparent plate can be filled with the elastic film. As a result, an optical image of a rigid pattern having a good contrast can be obtained and converted into a high-precision electrical signal, just as in the fingerprint sensors in FIGS. 3 to 15, and can be immediately verified with a pre-registered content.

According to the present invention as described above, an uneven-surface data detection apparatus which can reliably detect a rigid object and which has a wider application range can be provided.

Figure 39:
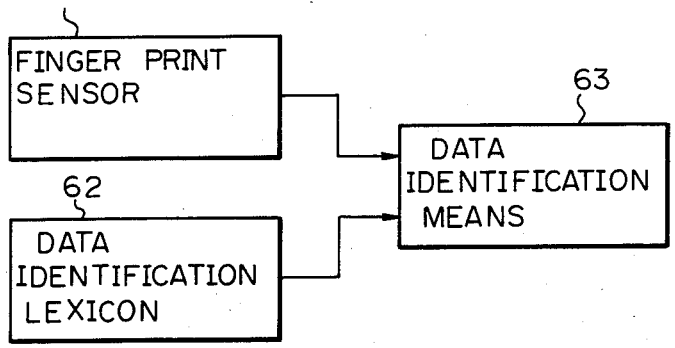
FIG. 39 is a block diagram of a conventional personal identification system.

FIG. 39 is a block diagram of a conventional personal identification apparatus. In the conventional personal identification apparatus of FIG. 39 which uses a fingerprint as personal data, a fingerprint sensor is used as a personal data input means, and a fingerprint sensor 61 and a data identification dictionary (lexicon) 62 are employed. Fingerprint data is registered in advance in the lexicon 62 (e.g., a card) by way of the sensor 61.

When a fingerprint is input to the identification means 63 for personal identification, the input fingerprint is compared with the fingerprint registered in the lexicon 62. In this apparatus, a fingerprint sensors is used as the personal data input means.

Even if an object is not a living body, if an image corresponding to a fingerprint can be obtained, the fingerprint sensor inputs an electrical signal into the apparatus. Meanwhile, if an input fingerprint coincides with a fingerprint registered in the lexicon 62, the conventional personal identification apparatus determines that a person currently inputting the fingerprint is identical to the registered person.

However, if an object which can produce the same data as a registered fingerprint (e.g., a replica of the registered fingerprint made of gypsum or soft rubber) is prepared and the fingerprint of the replica is input, the personal identification system can be by-passed.

The following embodiments relate to a personal identification system and, more particularly, to a personal identification system comprising a bio-detection means and a identification method therefor.

Various techniques for keeping data processing systems confidential having been developed in line with the progress of high-tech information business. For example, in place of a conventional ID card which frequently, can be misplaced or stolen, a personal identification system for checking personnel entering a computer room is now widely used.

However, personal identification using a fingerprint is not always perfect. For example, if a replica of a registered fingerprint is prepared, the system can be by-passed, as described above. For this reason, a strong demand has arisen for a personal identification system which can confirm that a detected object is a living body.

Figure 22:
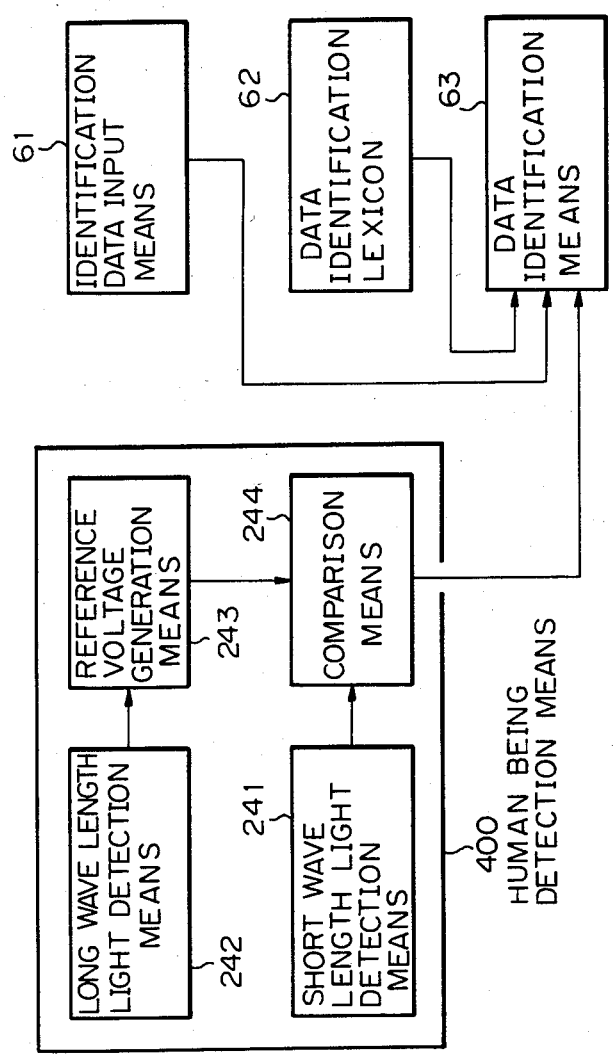
FIG. 22 is a block diagram of a personal identification apparatus according to the present invention.

FIG. 22 is a block diagram of a personal identification apparatus according to still another embodiment of the present invention.

In order to solve the above problem, a personal identification apparatus of the present invention as shown in FIG. 22 comprises a bio-detecting means 400 including a photodetecting means 241 for detecting light in a visible light range having a short wavelength of 440 to 580 nm, a photodetecting means 242 for detecting light in a light range having a wavelength longer than 630 nm, a reference voltage generating means 243 for generating a reference voltage in response to the output voltage from the photodetecting means 242, and a comparing means 244 for comparing the reference voltage with the output voltage from the photodetecting means 241. After the bio-detecting means 400 confirms that an object to be detected is a living body, personal data input through a personal data input means 61 and personal data prestored in a data identification lexicon 62 are verified by a data identification means 63.

Figure 21:
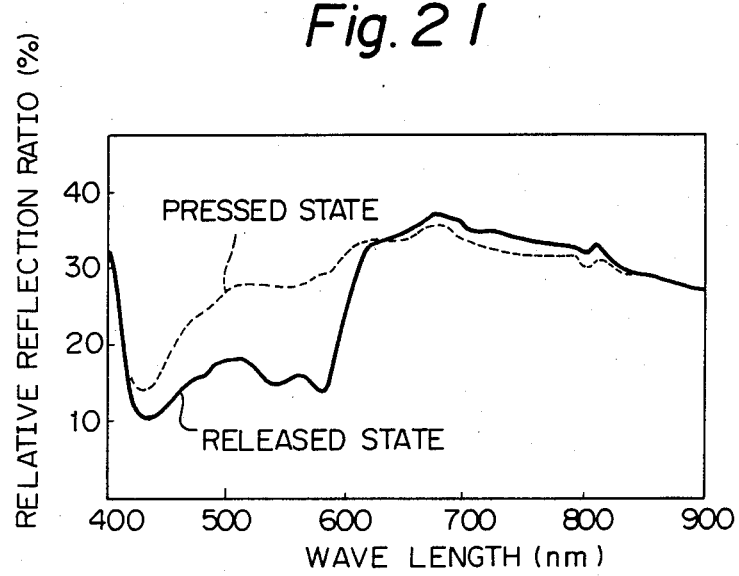
FIG. 21 is a graph of the spectral reflectance of human skin.

As shown in the spectral reflectance graph of FIG. 21, human skin has a depression force dependency such that its reflectance varies depending on a depression force in a visible light region of 580 nm or less.

Referring to FIG. 22, the output voltage from the photodetecting means 241 changes before and after a pressure is applied to an object. More specifically, the reference voltage is generated by the reference voltage generating means 243 in response to the output voltage from the photodetecting means 242, and a change in output voltage from the photodetecting means 241 before and after the application of pressure is detected based on the reference voltage. In this way, it can be detected whether the object is a living body or a replica.

After the bio-detecting means 400 detects that the object is a living body, personal data input through the personal data input means 61 and personal data prestored in the data identification lexicon 62 are verified, thereby preventing illegal use of the personal identification system by means of, e.g., a replica of a fingerprint.

Figure 23:
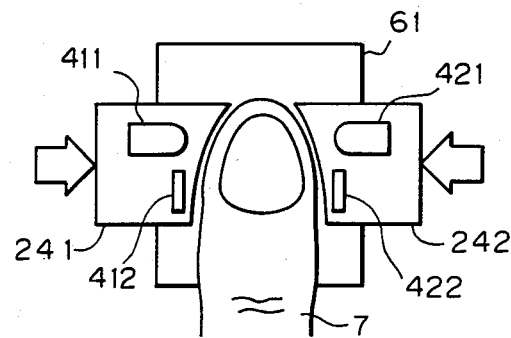
FIG. 23 is a plan view of a bio-detection optical system of the apparatus in FIG. 22.
Figure 24:
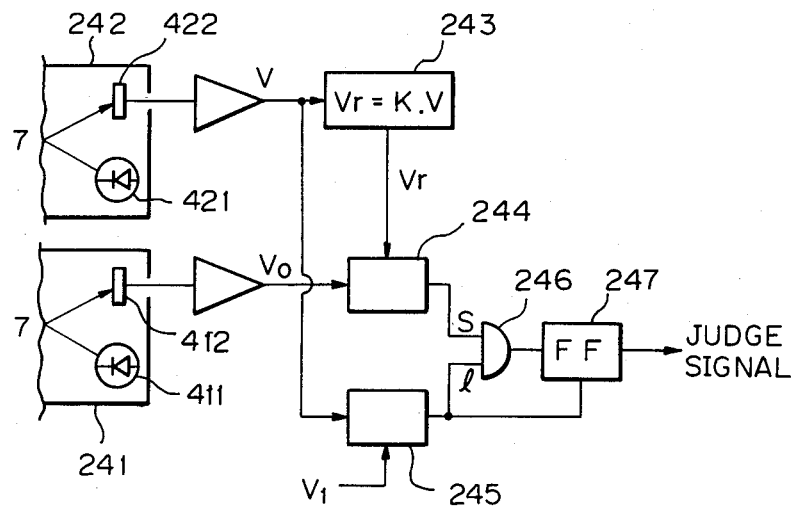
FIG. 24 is a circuit diagram of the bio-detection in FIG. 23.

Another embodiment of the present invention will now be described with reference to FIGS. 23 and 24, in which FIG. 23 is a plan view showing a bio-detection optical system according to still another embodiment of the present invention, and FIG. 24 is a circuit diagram of the bio-detection optical system in FIG. 23.

Referring to FIG. 23, a personal data input means (in this embodiment, a fingerprint sensor is used and will be referred to as fingerprint sensor hereinafter) 61 comprises a bio-detection optical system consisting of means (to be referred to as a short-wavelength photosensor hereinafter) 241 for detecting light having a short wavelength, e.g., 440 to 580 nm, and means (to be referred to as a long-wavelength photosensor hereinafter) 242 for detecting light having a wavelength longer than 630 nm. The short-wavelength photosensor 241 has a light-emitting diode 411 and a photodiode 412, and the long-wavelength photosensor 242 has a light-emitting diode 421 and a photodiode 422. The photosensors 241 and 242 are moved in directions indicated by the arrows, respectively, so as to sandwich a finger 7 placed on the fingerprint sensor 61 therebetween.

Referring to FIG. 24, the bio-detecting means 400 comprises a bio-detection optical system including the short-wavelength photosensor 241 and the long-wavelength photosensor 242, means for generating a reference voltage in response to the output voltage from the photosensor 242, i.e., a reference voltage generator 243, comparing means for comparing the reference voltage with the output voltage from the photosensor 241, i.e., a bio-discrimination comparator 244, and a contact detection comparator 245 for detecting when the photosensor 242 is brought into contact with the finger 7.

The bio-detection optical system, i.e, the photosensors 241 and 242 are moved in the direction of the arrows, and when the photosensor 242 is brought into contsct with the finger 7, a voltage V is generated therefrom. A reference voltage V1 input to the comparator 245 is compared with the output voltage V, and when the voltage V exceeds the voltage V1, it is detected that the photosensor 242 is in contact with the finger 7, thus setting an l terminal of an AND circuit 246 at a "1" level.

At the same time, the output voltage V is supplied to the generator 243, and a reference voltage Vr (where $Vr = k \cdot V$, where k is a conversion coefficient preset in the generator 243) is generated by the generator 243. An output voltage V0 from the photosensor 241 is compared with the reference voltage Vr by the comparator 244.

If the object is a living body, the following relationship is established immediately after the photosensor 241 comes into contact with the finger 7:

$$V_0 < V_r$$

As the compression force increases, the above relationship is inverted, and becomes:

$$V_0 \geq V_r$$

The comparator 244 detects the above relationship between the output voltage V0 from the photosensor 241 and the reference voltage Vr. When the relationship is $V_0 \geq V_r$, the comparator 244 generates a discrimination signal, thus setting an s terminal of the AND circuit 246 at a "1" level.

When the photosensor 242 comes into contact with the finger 7 to set the l terminal of the AND circuit 246 at a "1" level, and when the relationship (i.e., when the output voltage $V_0 \geq$ the reference voltage Vr) is established to set the s terminal of the circuit 246 at a "1" level, a flip-flop (FF) 247 is set so that a fingerprint input through the sensor 61 and a fingerprint pre-registered in the data identification lexicon 62 are verified. Note that when the finger is removed from the above bio-detection optical system, the FF 247 is reset because the output level of the comparator 245 is inverted.

If the object is something other than a living body, the above relationship is not established between the output voltage V0 from the photosensor 241 and the reference voltage Vr, and the discrimination signal is not generated from the comparator 244.

In this way, the bio-detecting means of this embodiment utilizes a depression force dependency unique to human skin which is that a reflectance varies widely in the visible light region of 580 nm or less. After the bio-detecting means detects that the object is a living body, a fingerprint input through the fingerprint sensor 61 and a fingerprint pre-registered in the lexicon 62 are verified, thus preventing illegal use of the personal identification system by means of a replica of a fingerprint.

Figure 25:
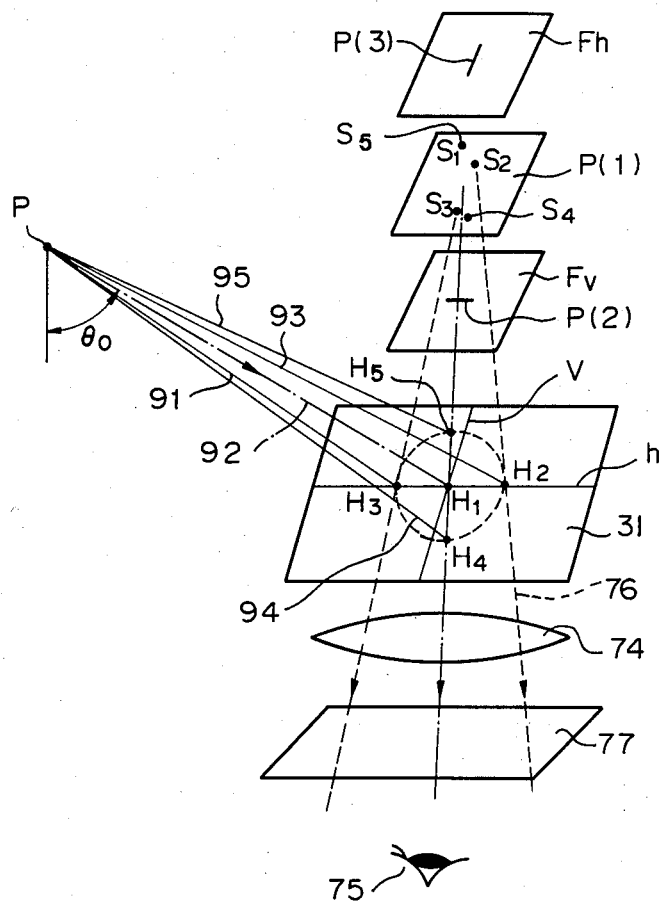
FIG. 25 is a diagram showing causes of aberrations in a hologram.

In the above-mentioned embodiments, if a formation wavefront during formation of a hologram and a reconstruction wavefront from a fingerprint under detection are different, aberrations are generated in the observed uneven-surface data imge. FIG. 25 is a perspective view for explaining the causes of such aberrations. In the drawings of the above-mentioned embodiments, light scattered at a certain point on a finger is indicated by a single line. In practice, however, the light scattered at a point P propagates and spreads into a diffused spherical waveform before reaching a hologram 31, as shown in FIG. 26(a). FIG. 25 shows a developed optical path from the point P on the finger to the hologram 31 in FIG. 26(a).

If light incident on the hologram 31 from the point P is parallel to an object wave 318, shown in FIG. 26(b), during the formation of the hologram, an aberration is not generated. However, in practice, scattered light components are generated as indicated by numerals 91, 92, 93, 94, and 95 in FIG. 25 and are incident on the hologram 31. Assuming that only the light beam 92 is parallel to the object wave 318, the other beams 91, 93, 94, and 95 cause an aberration thus blurring an image.

The light scattered at the point P on the finger passes through points H1 to H5 on the hologram 31, and reaches an eye 75 of an observer through an imaging lens 74. If diffraction light beams 76 are extended in a direction opposite to their propagation direction, they will cross at a point corresponding to an image P(1) of the point P of the finger, which is observed by the observer. However, these beams cannot cross at a signal point, regardless of the position of a screen 77, as indicated by points S1 to S5, thus causing aberration. As described above, since the holograms 31 for guiding data light has a difference between the formation wavefront thereof and the reconstruction wavefront from a fingerprint regardless of object waves, an aberration is generated in a fingerprint image to be detected.

In FIG. 26(a), lattice fringes 3s in the hologram 31 are perpendicular to an optical path extending from the point P to the hologram 31. For this reason, if a direction of the lattice fringes is represented by a vertical direction v, and a direction perpendicular to the fringes is represented by a horizontal direction h, aberration can be classified into vertical and horizontal aberrations. Because of the presence of astigmatism, at vertical focal point Fv, shown in FIG. 25, a virtual image P(2) of the point P of the finger is clearly focused in the vertical direction, but is expanded and blurred in the horizontal direction. In contrast to this, at a horizontal focal point Fh, a virtual image P(3) of the point P is focused in the horizontal direction but is expanded and blurred in the vertical direction.

FIG. 27 shows an image on the screen 77 when nine spot-like projections P are pressed against an uneven-surface data input portion 1a. Images P(2) at the vertical focal point Fv are expanded in the horizontal direction to look like horizontal stripes. On the other hand, images P(3) at the horizontal focal point Fh are expanded in the vertical direction to look like vertical stripes.

Therefore, the following embodiment of the present invention has as its object to provide an uneven-surface data detection apparatus which is free from the above problems, and can obtain clear uneven-surface data without being adversely influenced by aberration.

FIG. 28 is an embodiment of an uneven-surface data detection apparatus. Reference numeral 1 denotes a transparent plate having a hologram 31 on its back surface. Assuming that nine spot-like projections P are pressed against an uneven-surface data input portion 1a of the plate 1, lattice fringes 3s of the hologram 31 are perpendicular to the optical path extending from the portion 1a to the hologram 31. For this reason, virtual images of the projections P in the vertical direction are focused at a vertical focal point Fv near the hologram 31, and those in the horizontal direction are focused at a horizontal focal point Fh further removed from the hologram 31.

Two orthogonal cylindrical lenses CL1 and CL2 are arranged at positions opposing the hologram 31 of the plate 1. The cylindrical lens CL1 nearest the hologram 31 has an axis c parallel to the expansion direction of the virtual images P(3) at the horizontal focal point Fh. The cylindrical lens CL2 away from the hologram 31 has an axis c parallel to the expansion direction of the virtual images P(2) at the vertical focal point Fv.

It should be noted that a hologram can provide the same effect as that of a cylindrical lens. Therefore, in this embodiment, all optical elements which have the same function as a cylindrical lens are included in the concept of the cylindrical lens.

The hologram 31 can be prepared using plane waves for both reference and object waves, or using a spherical wave for at least one of the reference and object waves.

FIG. 29 is a diagram for explaining the operation of the uneven-surface data detection apparatus shown in FIG. 28, in which FIG. 29(a) is a plan view, and FIG. 29(b) is a side view. Reference numeral 77 denotes a screen, where two virtual images P(2) and P(3) formed at positions behind the hologram 31 (i.e., at a vertical focal point Fv and a horizontal focal point Fh, respectively) are independently focussed on a single screen surface. The virtual image P(3) at the horizontal focal point Fh removed from the hologram 31 is focused on the screen 77 by the cylindrical lens CL1 having a focal length f1. At this point, since the cylindrical lens CL1 has no convergence function in the axial direction c thereof, the image P(3) is not influenced in the vertical direction. The virtual image P(2) at the vertical focal point Fv near the hologram 31 is focused on the screen 77 by the cylindrical lens CL2 having a focal length f2. At this point, since the cylindrical lens CL2 has no convergence function in the axial direction c thereof, the image P(2) is not influenced in the horizontal direction.

In this way, when the two cylindrical lenses CL1 and CL2 are arranged to be orthogonal to each other, the images P(3) and P(2) are focused on the screen 77 independently to overlap each other, thereby obtaining an image P(4). As a result, even if virtual images formed by the hologram 31 have an astigmatism, they can be observed by an imaging system at a given position of the screen 77, thus improving image contrast.

With this embodiment, when positions of the cylindrical lenses CL1 and CL2 are selected, a height/width ratio of the resultant image can be freely selected. A case will now be exemplified wherein a hologram is prepared using a plane wave.

The problem of the height/weight ratio can be solved by properly selecting a difference "f1−f2" of the focal lengths between the two cylindrical lenses CL1 and CL2. In this case, a pitch of vertical stripes in image P(3) and a pitch of horizontal stripes in image P(2) are the same; and are given by m. Therefore, in this case, the pitch m need only be extended by a length n1 and n2 on the screen 77, respectively ($n1/m=M1$, $n2/m=M2$, where M1 and M2 are optical magnifications, n1 is a lateral length, and n2 is a longitudinal length). In the horizontal focal point correction system of FIG. 29(a), a distance from the image P(3) to the cylindrical lens CL1 is given by a1, and a distance from the cylindrical lens CL1 to the screen 77 is given by b1. Similarly, in the vertical focal point correction system of FIG. 29(b), a distance from the image P(2) to the cylindrical lens CL2 is given by a2, and a distance from the cylindrical lens CL2 to the screen 77 is given by b2. At this time, if an astigmatism is represented by dz:

$$dz=(a1+b1)-(a2+b2) \quad (1)$$

From similarity, we have:

$$M1 = n1/m \quad (2)$$
$$= b1/a1$$

$$M2 = n2/m \quad (3)$$
$$= b2/a2$$

and from a lens formula, we have:

$$1/a1+1/b1=1/f1 \quad (4)$$

$$1/a2+1/b2=1/f2 \quad (5)$$

if a1, a2, b1, and b2 are eliminated from the above relations, then:

$$dz=((M1+1)^2/M1)f1-((M2+1)^2/M2)f2 \quad (6)$$

Therefore, if cylindrical lenses having a focal length of f1 and f2 which can satisfy relation (6) are selected, the image P(4) on the screen 77 can be set at desired lateral and longitudinal magnifications M1 and M2.

Figure 30:
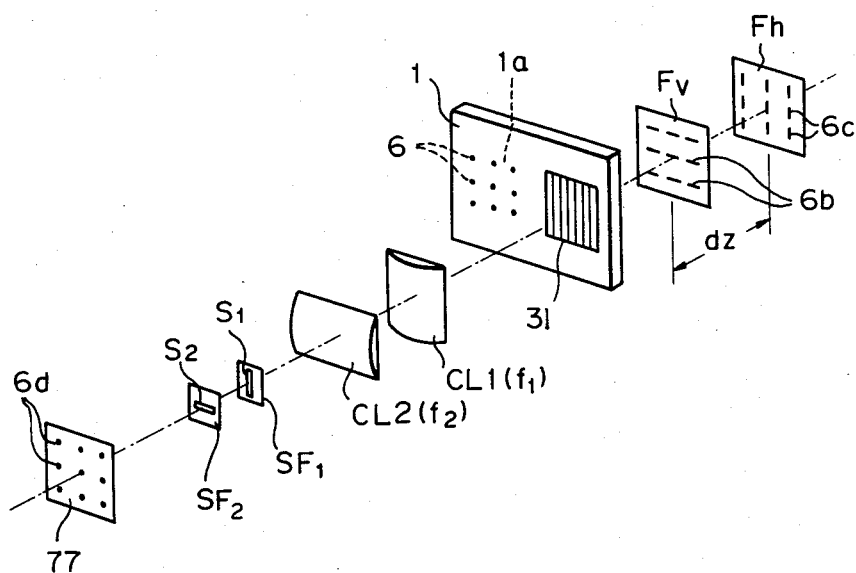
FIG. 30 is a diagram an arrangement according to still another embodiment of the present invention.

An uneven-surface data detection apparatus according to still another embodiment of the present invention will be described with reference to the perspective view of FIG. 30. A first cylindrical lens CL1 for correcting a virtual image P(3) removed from a hologram 31, and a second cylindrical lens CL2 for correcting a virtual image P(2) near the hologram 31 are arranged opposite to the hologram 31 of a transparent plate 1, and are orthogonal to each other. In this embodiment, two spatial filters SF1 and SF2 are arranged between a position of a screen 77 at which a detecting means is arranged and the cylindrical lenses CL1 and CL2. The spatial filter SF1 nearer the cylindrical lenses CL1 and CL2 has a slit S1 parallel to an axis c of the lens CL1, and the spatial filter SF2 removed from the lenses CL1 and CL2 has a slit S2 parallel to an axis c of the lens CL2.

Figure 31A:
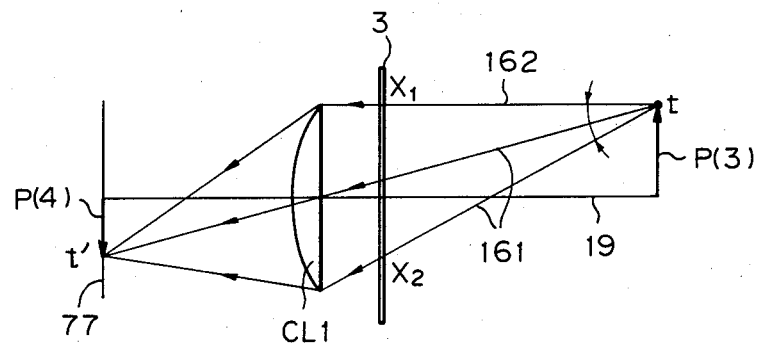
FIGS. 31(a) and 31(b) are diagrams of the focal point correction system of the embodiment shown in FIG. 30.
Figure 31B:
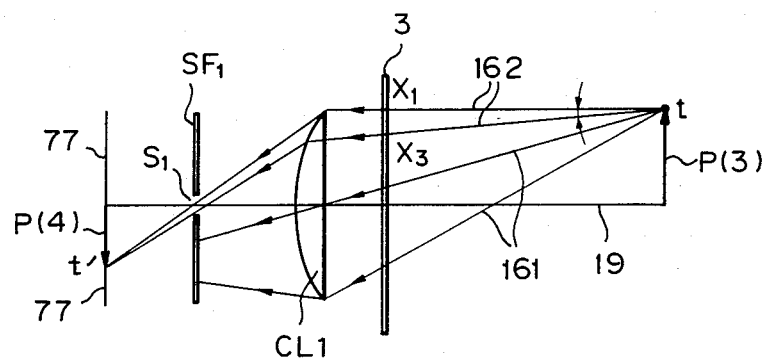

FIGS. 31(a) and 31(b) explain a spatial filter function in view of a horizontal focal point correction system, in which FIG. 31(a) shows a case wherein no spatial filter is provided, and FIG. 31(b) shows a case wherein the spatial filter is provided. In FIG. 31(b), the spatial filter SF1 having the slit S1 is arranged at the focal point of the cylindrical lens CL1. As shown in FIG. 31(a), when no spatial filter SF1 is provided, light incident on the cylindrical lens CL1 from the virtual image P(3) is focused on the screen 77. However, since the light beams 161 which are not parallel to an optical axis 19 of the cylindrical lens CL1 do not pass near the focal point of the lens CL1, image contrast is impaired. When the spatial filter SF1 having the slit S1 is arranged at the focal point of the cylindrical lens CL1 as shown in FIG. 31(b), only light beams 162 substantially parallel to the optical axis 19 can reach the screen 77, but the light beams 161 which cause blurring are cut off by the spatial filter SF1. In this way, even though the light beams 161 which impair the contrast can be cut off, if an optical axis selected by the filter SF1 coincides with the optical axis of a light beam which satisfies the Bragg condition, decrease in the total amount of light can be avoided.

Since an effective range of the hologram 31 is narrowed from X1-X2 to X1-X3 due to the presence of the spatial filter SF1, aberration can be further reduced, and image blurring can be prevented. This provides the same effect as when a thick hologram is used to reduce aberration.

According to the present invention as described above, when two correction cylindrical lenses CL1 and CL2 corresponding to the horizontal and the vertical focal points Fh and Fv are arranged orthogonal to each other between the hologram 31 for guiding an optical image from the transparent plate 1 and the detecting means, high-contrast uneven-surface data can be obtained, and the height/width ratio can be freely selected.

In an uneven-surface data detection apparatus, when characteristic evaluation of the apparatus is performed or a fingerprint is input as personal data, a plurality of specific uneven-surface data are often required. For this purpose, while an uneven surface such as a fingerprint is pressed against an input section, it need only be sensed a plurality of times. However, sensing conditions (e.g., shutter speed) or input conditions of the fingerprint (such as displacement of the finger) may often vary. Therefore, a plurality of uneven-surface data are preferably sensed at the same time.

Figure 33:
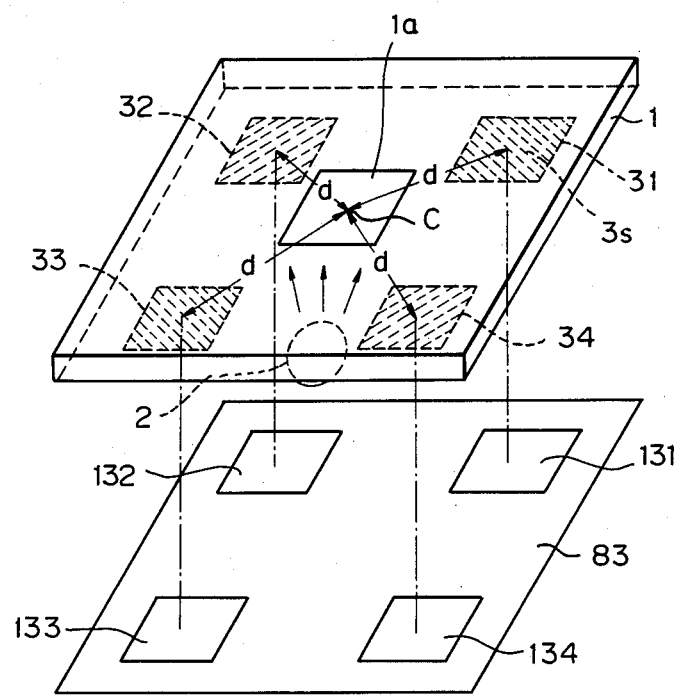
FIG. 33 is still another embodiment of the present invention.

FIG. 33 is a perspective view of an uneven-surface data detection apparatus according to another embodiment of the present invention. Reference numeral 1 denotes a plate transparent to light emitted from a light source 2. The plate 1 has an uneven-surface data input portion 1a on its central front surface. A plurality of holograms, e.g., 31 to 34, are arranged on the back surface of the plate 1 and are separated from the center of the input section 1a at equal distances d. The holograms 31 to 34 can be either of the phase or surfacerelief type. A single film 83 for simultaneously sensing images derived from the holograms 31 to 34 is arranged below the plate 1. The light source 2 for illuminating the input section 1a is arranged below the back surface of the input section 1a.

Figure 32:
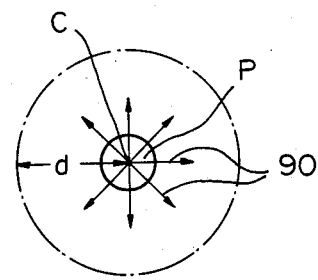
FIG. 32 is a plan view of the optical path from an uneven-surface data input section of the present invention.

When a finger 7 is pressed against the input section 1a just as in the previous embodiments, scattered light components from a projection of the finger 7 are totally reflected on the basis of the principle shown in FIG. 2. In this case, as shown in FIG. 32, the totally reflected light beams 90 radially propagate from a center c of the input section 1a in all directions. For this reason, the light beams 90 reach all the holograms 31 to 34 and are guided outside the plate 1. Optical images so guided by the holograms 31 to 34 are simultaneously formed at positions 131 to 134 on the single film 83.

In this case, since the distance from the input section 1a to each of the holograms 31 to 34 is d, the optical path lengths from the input section 1a to the holograms 31 to 34 are equal to each other. The uneven-surface images can thus be formed on the film 83 under the same conditions. In addition, since the images can be obtained from the holograms 31 to 34 under the same conditions as in an apparatus for obtaining a signal image, the amount of image light will not be small and an exposure time will not be prolonged.

If the optical paths extending from the input section 1a to the holograms 31 to 34 are developed, they are the same as those in the previous embodiments. More specifically, diffraction grating fringes 3s are arranged perpendicular to the optical paths extending from the section 1a to the holograms 31 to 34 and thus are perpendicular to the totally reflected light beams 90.

In FIG. 33 the film 83 is arranged opposite to the transparent plate 1. However, as will be apparent from the following embodiments, light reflected by a reflection mirror can be sensed, or various optical elements can be inserted in the optical paths extending from the holograms 31 to 34 to the imaging film so as to improve various characteristics of the device.

Figure 34:
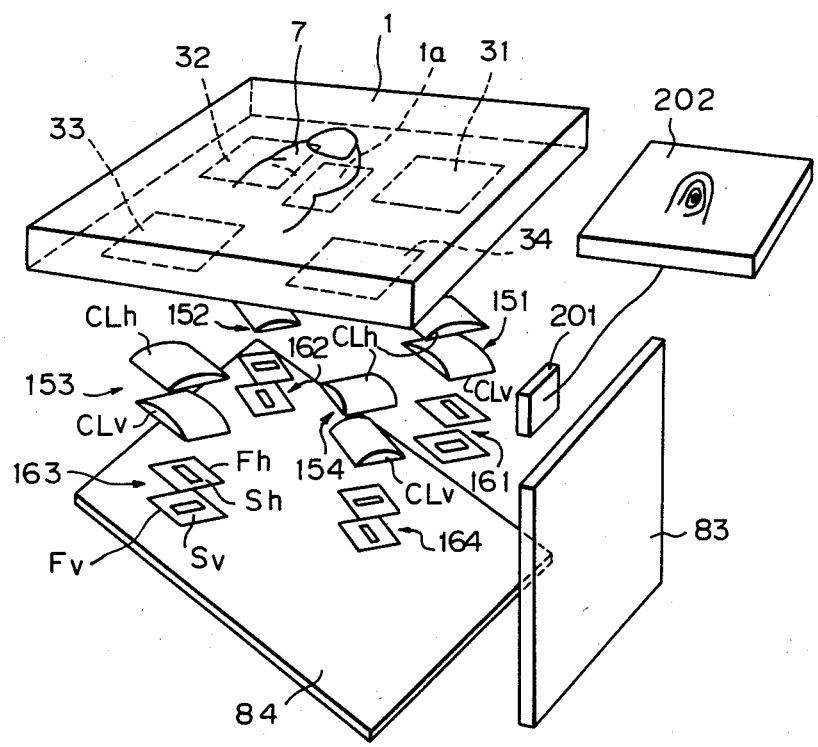
FIG. 34 is a diagram of the embodiment shown in FIG. 33.

An uneven-surface data detection apparatus according to still another embodiment of the present invention will now be described with reference to FIG. 34, which is a perspective view thereof. Holograms 31 to 34 are arranged at equal distances from an uneven-surface data input section 1a. In FIG. 34, four holograms are provided, but the number of holograms can be changed in accordance with the number of images obtained at the same time. A reflection mirror 84 is obliquely arranged opposite the surface of the plate 1 on which the holograms 31 to 34 are provided. Therefore, images derived by the holograms 31 to 34 are reflected by the mirror 84. Reference numeral 83 denotes a film for sensing the images reflected by the mirror 84. When uneven-surface data is to be obtained immediately, an instant camera (for example, a "Polaroid" camera) is preferably used for the film 83.

A plurality of cylindrical lens pairs 151 to 154 are arranged to correspond to the holograms 31 to 34. Each of the cylindrical lens pairs 151 to 154 consists of a vertical cylindrical lens CLv and a horizontal cylindrical lens CLh, which are orthogonal to each other. Since a vertical focal point (in a direction of the optical path from the input section 1a to the holograms 31 to 34) does not coincide with a horizontal focal point (in a direction perpendicular to the optical paths) due to an astigmatism of the holograms 31 to 34 resultant images are blurred. Therefore, in order to correct the blurred images, the cylindrical lens pairs 151 to 154 are provided. A plurality of spatial filter pairs 161 to 164, each consisting of a spatial filter Fv having a slit Sv parallel to the axis of the cylindrical lens CLv and a spatial filter Fh having a slit Sh parallel to the axis of the cylindrical lens CLh are arranged immediately below the respective cylindrical lens pairs 151 to 154.

The descriptions of shift in vertical and horizontal focal points and the operation of the cylindrical lenses and the spatial filters are the same as those made with reference to FIGS. 25, 29, and 31.

A photoelectric conversion element 201 comprising a charge-coupled device is arranged at a position separate from the film 83, so that an image is converted into an electrical signal and is displayed on a display device 202, thus checking if a finger 7 is located at the center of the input section 1a.

When optical images picked up from the holograms 31 to 34 through the cylindrical lens pairs 151 to 154 are displayed on the display device 202, a direction of the finger 7 in FIG. 34 is reversed. As shown in FIG. 34, when light is temporarily reflected by the mirror 84 and is then incident on the film 83, since the image is again reversed by the mirror 84, a finger image having the same direction as that of the finger on the input section 1a can be formed on the film 83. An odd number of reflection mirrors exceeding three (3) can be used. In this embodiment, the angles of the reflection mirror 84 and the film 83 are selected so that the optical path lengths from the holograms 31 to 34 to the film 83 through the mirror 84 are the same.

Although the film 83 must be large enough to form all images from the holograms 31 to 34 at the same time, the photoelectric conversion element 201 need only have a size sufficient for detecting an image from any one of the holograms.

With the method of this embodiment, a plurality of holograms 31 to 34 for drawing out images are arranged at positions separated at equal distances from the input section 1a at the center of the plate 1. Optical images obtained therefrom are formed on a single film, thus obtaining a plurality of uneven-surface data at the same time. As a result, an exposure time need not be prolonged when compared with a method using a half mirror, and clear images can be obtained with a simple operation. In addition, total cost can be reduced because of the simple arrangement.

In the above embodiments, since the light source 2 is arranged immediately below the plate 1, when an operator touches the uneven-surface data input section 1a with his finger at the entrance of a computer room, light emitted from the light source 2 may get in his eyes, thus having an adverse influence on his eyes. Since a laser device is normally used for the light source 2, this creates a serious problem. A possible solution to this problems is, for example, a light-shielding cover provided over the apparatus, so that a finger is inserted therein. However, since the position of the finger cannot be confirmed with such a cover in place, the fingertip cannot be precisely aligned with the center of the input section 1a. In addition, since the input section 1a is easily contaminated with an aqueous or lipidic component of a residual fingerprint, the light cover makes it difficult to see the contaminated portion and clean it.

Alternatively, a touch switch for detecting the contacting of a finger is provided on transparent plate 1, so that only when it is detected that the finger is being pressed against the input section 1a, is the laser light source 2 enabled. However, a special control circuit is then required, and light leaking around the finger may also undesirably get in the operator's eyes.

Figure 38A:
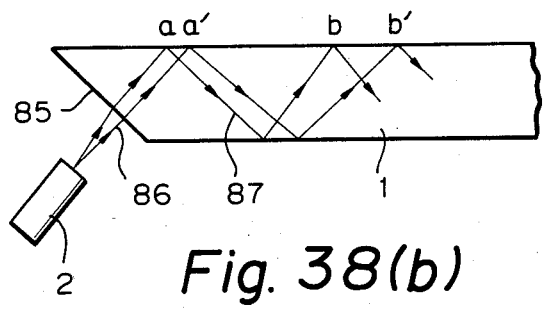
FIGS. 38(a) and 38(b) are diagrams of the laser optical path of an uneven-surface data detection apparatus according to the present invention.
Figure 38B:
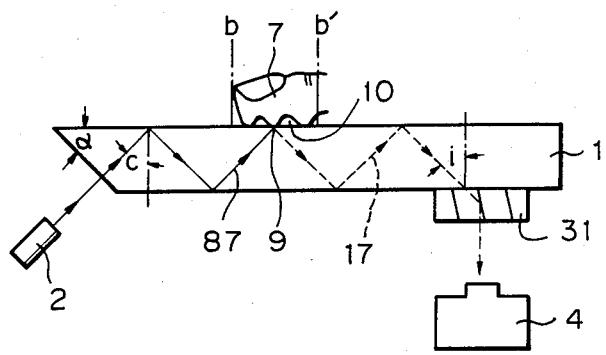

An arrangement in FIGS. 38(a) and 38(b) shows a method of detecting uneven-surface data under totally reflected illumination, in which the concept of the transparent plate 1 is also adopted. As shown in FIG. 38(a), the end face of a transparent plate 1 is obliquely cut, so that a laser beam 86 becomes incident from an oblique surface 85. The laser beam is totally reflected at regions between a—a' and b—b' by a transparent plate-/air interface on the surface of the plate 1, thus enabling totally reflected illumination. As shown in FIG. 38(b), when an angle α of the oblique surface 85 and a critical angle c of the transparent plate surface are selected, total reflection is repeated, and totally reflected light 87 is guided to a hologram 31 without exiting the plate 1.

If the regions between a—a' and b—b' of the front surface of the plate 1 are used as the uneven-surface data input section 1a, light is scattered by a projection 9 of the uneven surface, and propagates to the hologram 31 just as in the case shown in FIG. 17. At a recess 10, since light is totally reflected by the transparent plate-/air interface, the totally reflected light also reaches the hologram 31. When the totally reflected light is detected by the hologram 31, the projection 9 is dark and the recess 10 is bright, like a negative. In order to overcome this, when an incident angle i to the hologram 31 is set at an angle different from the critical angle c, the totally reflected light 87 is not incident on the hologram 31, and only the scattered light from the projection 9 is incident thereon.

With this arrangement, since all the laser beams are totally reflected in the plate 1, the eyes of an operator can be protected therefrom. However, even if the incident angle i is different from the critical angle c, the totally reflected light 87 cannot completely be shielded, thus creating the problem of degraded contrast.

The following embodiment of the present invention aims to provide an uneven-surface data detection apparatus with the above arrangement, which is free from the above problem and which can detect high-contrast uneven-surface data without being influenced by the totally reflected light.

Figure 35A:
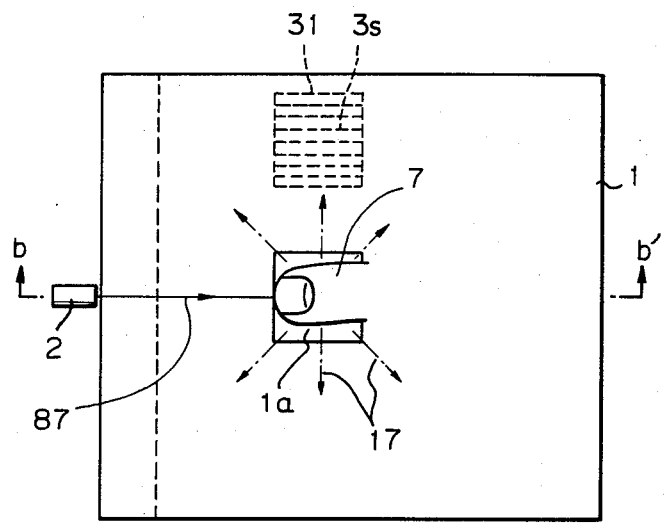
FIGS. 35(a) and 35(b) are another embodiment of the present invention.
Figure 35B:
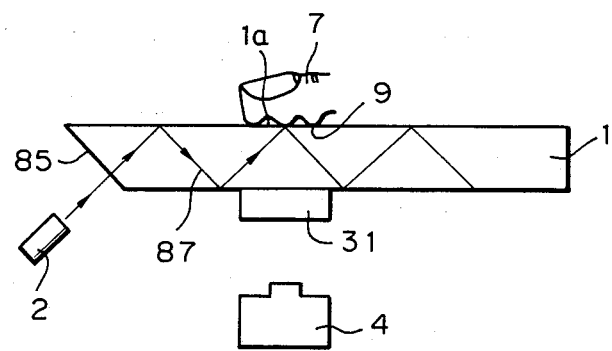

FIGS. 35(a) and 35(b) are uneven-surface data detection apparatus, in which FIG. 35(a) is a plan view and FIG. 35(b) is a sectional view taken along a line b—b' of FIG. 35(a). Reference numeral 1 denotes a plate being transparent to light emitted from a light source 2. An uneven-surface data input section 1a is illuminated by totally reflected light 87. The input section 1a is arranged on the front surface of the plate 1 midway along an optical path of totally reflected light 87. Reference numeral 31 denotes a hologram for guiding an optical image outside the plate 1. The hologram 31 is arranged at a position away from the optical path of the light 87. An optical image externally guided by the hologram 31 is detected by an imaging element (detector) 4.

In order to introduce the totally reflected light 87 into the transparent plate 1, the end face of the plate 1 is cut obliquely, so that a laser beam becomes incident through an oblique surface 85 thereof. Alternatively, another hologram is provided on the back surface of the transparent plate 1, and is irradiated with a laser beam so as to introduce the beam into the plate 1.

When a finger 7 is pressed against the input section 1a in the same manner as in FIG. 38, the light 87 illuminates the uneven surface thereof and then repetitively propagates the light so as to be totally reflected. On the other hand, light scattered by a projection 9 of the finger 7 radially propagates in every direction, as indicated by numeral 17 in FIG. 35(a). For this reason, only the light scattered by the projection 9 is transmitted by total reflection to the hologram 31 which is arranged at a position away from the optical path of the light 87, and is guided outside the plate 1. However, the light 87 is not transmitted to the image position of the hologram 31 to be incident on the hologram 31 and to brighten the image, thus preventing a poor-contrast image. Since the light 87 is totally reflected in the plate 1, it can no longer get in the eyes of an operator when he touches the input section 1a.

Figure 36:
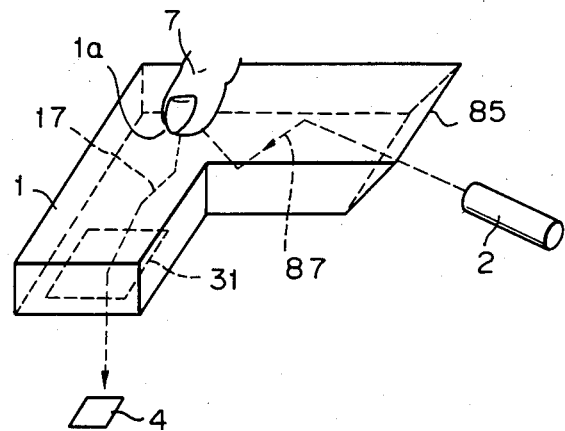
FIG. 36 is still another embodiment of the present invention.

An uneven-surface data detection apparatus according to still another embodiment of the present invention will now be described. FIG. 36 is a perspective view of an uneven-surface data detection apparatus of this embodiment. Since a transparent plate 1 has an L-shape, when a laser beam from a light source 2 becomes incident through an oblique surface 85 of the end portion of the plate 1, light 87 propagates in the plate 1 and is totally reflected. Light scattered by a projection of an uneven surface is totally reflected toward a hologram 31 arranged on the back surface of the end of the L-shaped portion opposite the light source 2, is guided outside the plate 1, and is then detected by an imaging element 4. Alternatively, if the hologram 31 is arranged at a position away from the optical path of the light 87, the plate 1 can be formed into a desired shape.

Figure 37:
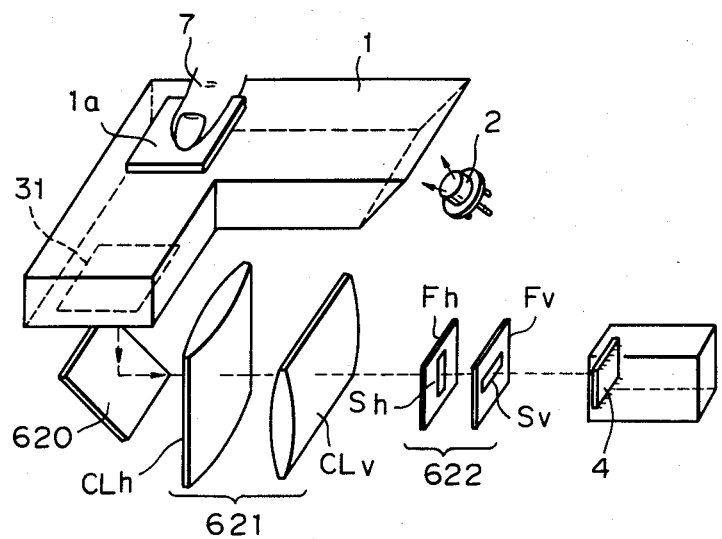
FIG. 37 is an improved embodiment of FIG. 36.

FIG. 37 is an improvement in the apparatus of the embodiment in FIG. 36. An image obtained from the hologram 31 is reflected by a reflection mirror 620, and becomes incident on the imaging element 4 through a cylindrical lens pair 621 and a spatial filter pair 622. Alternatively, the cylindrical lenses 621 and the spatial filters 622 can be arranged immediately below the hologram 31 without using the mirror 620.

The cylindrical lens pair 621 includes a vertical cylindrical lens CLv and a horizontal cylindrical lens CLh, which are orthogonal to each other. A vertical focal point (in a direction of the optical path from the input section 1a to the hologram 31) does not coincide with a horizontal focal point (in a direction perpendicular to the optical path) due to an astigmatism of the hologram 31, and a resultant image is blurred. In order to correct the blurred image, the cylindrical lenses CLv and CLh are provided. The spatial filter pair 622 consists of a spatial filter Fv having a slit Sv parallel to the axis of the cylindrical lens CLv and a spatial filter Fh having a slit Sh parallel to the axis of the cylindrical lens CLh.

Descriptions of shift in vertical and horizontal focal points and the operation of the cylindrical lenses and the spatial filters are the same as those made with reference to FIGS. 25, 29, and 31.

In the embodiment described above, in the uneven-surface data detection apparatus in which the uneven-surface data input section 1a is illuminated with totally reflected light so as to protect the eyes of an operator from a laser beam, since the hologram 31 is arranged at a position away from the optical path of the totally reflected light, the totally reflected light will not reach the hologram 31. As a result, the problem of part of the totally reflected light reaching the hologram 31 causing a poor-contrast image is solved.

What is claimed is:

1. An uneven-surface data detection apparatus for detecting an uneven-surface having projection portions and recess portions, comprising:
   a transparent plate having upper and lower surfaces and having an uneven-surface contact portion against which an uneven-surface to be detected is pressed;
   a light source for illuminating the entire area of said uneven-surface contact portion through said transparent plate;
   an uneven-surface image drawing out optical element for drawing out the light reflected on said uneven-surface contact portion of said transparent plate; and
   a detector for detecting the light drawn out from said transparent plate by said optical element, light reflected by the projection portions of said uneven-surface on said uneven-surface contact portion diverges from a propagation direction of light reflected by the recess portions of said uneven-surface on said uneven-surface contact portion, and said optical element is arranged to guide the light reflected by said projection portions into said detector, said light source simultaneously illuminating said projection portions and recess portions over said uneven-surface contact portion and the light reflected by said projection portions being totally reflected at least one time at a surface opposite the surface where the uneven-surface contact portion is located and then guided to said detector through said uneven-surface image drawing out optical element.

2. An apparatus according to claim 1, wherein said light source illuminates said uneven-surface contact portion at an illumination angle smaller than a critical angle so as not to totally reflect the light, wherein part of the light scattered by said projection is totally reflected at least once in said transparent plate so as to propagate through said transparent plate in a direction of said optical element, and wherein light, which passes through said transparent plate, illuminates said recess and is scattered thereby, re-enters said transparent plate to be discharged therefrom at the lower surface, thereby discriminating the scattered light from the totally reflected light.

3. An apparatus according to claim 1, wherein said optical element is a hologram.

4. An apparatus according to claim 1, wherein said optical element is a prism.

5. An apparatus according to claim 2, wherein said light source substantially vertically illuminates said uneven-surface contact portion from below.

6. An apparatus according to claim 2, wherein said light source illuminates said uneven-surface contact portion through said transparent plate at an angle falling within a range of −38° to +33° with respect to the upper surface of said plate, a vertical direction is considered a 0° and a direction toward said optical element is represented by negative direction.

7. An apparatus according to claim 1, wherein a hologram is arranged on the lower surface of said transparent plate, wherein said uneven-surface contact portion is illuminated with said light source at an illumination angle smaller than a critical angle so as not to totally reflect light, wherein the recess portions scatter light which is guided from the lower surface of said transparent plate to be diffracted in a direction of said detector, and wherein said hologram is arranged such that said light source illuminates the recess portions and the light therefrom is scattered, re-enters said transparent plate and is diffracted by the lower surface of said transparent plate in a direction other than that of said detector.

8. An apparatus according to claim 1, wherein said light source is an LED which illuminates said uneven-surface contact portion through a Lippmann hologram.

9. An apparatus according to claim 1, wherein a dust cover is arranged on at least one of the upper and lower surfaces of said transparent plate forming an air layer therebetween.

10. An apparatus according to claim 1, wherein an elastic member is arranged on the upper surface of said uneven-surface contact portion of said transparent plate.

11. An apparatus according to claim 1, further comprising:
    a personal verification system including:
       data verification means; and
       a data verification dictionary connected to said data verification means; and
    bio-detecting means, connected to said data verification means, for discriminating if the uneven-surface to be detected is a living body.

12. An apparatus according to claim 11, wherein said bio-detecting means comprises:
    first photodetecting means for detecting visible light at a short wavelength between 440 to 580 nm and generating an output signal;
    second photodetecting means for detecting light at a wavelength longer than 630 nm;
    reference voltage generating means, operatively connected to said second photodetecting means, for generating a reference voltage in response to an output voltage from said second photodetecting means; and
    comparing means, operatively connected to said first photodetecting means, for comparing the reference voltage with an output voltage from said first photodetecting means.

13. An apparatus according to claim 1, wherein said optical element is a hologram, and further comprising:
    a first cylindrical lens for focusing a virtual image focused at a vertical focal point, arranged opposite said hologram and having an axis parallel to an expansion direction of the virtual image at the horizontal focal point due to aberration; and
    a second cylindrical lens for focusing a virtual image focused at a horizontal focal point, arranged opposite said hologram and orthogonal to said first cylindrical lens and having an axis parallel to an expansion direction of the virtual image at the vertical focal point due to aberration.

14. An apparatus according to claim 13, wherein said hologram is produced by interference of plane waves, and a combination of said first and second cylindrical lenses satisfies a relation:

$$dz = ((M1+1)^2/M1) f1 - ((M2+1)^2/M2) f2$$

where f1 and f2 are focal lengths of said first and second cylindrical lenses, respectively, M1 is a lateral magnification, M2 is a longitudinal magnification, and dz is an astigmatic difference.

15. An apparatus according to claim 13, further comprising spatial filters parallel to the axes of said first and second cylindrical lenses and arranged at focal points of said first and second cylindrical lenses for eliminating image blurring.

16. An apparatus according to claim 1, further comprising a plurality of holograms provided on said transparent plate, and arranged at equal distances from said uneven-surface contact portion, a plurality of identical uneven-surface data being obtained from said holograms.

17. An apparatus according to claim 1, wherein said light source illuminates said uneven-surface contact portion at an illumination angle larger than a critical angle so as to be totally reflected and the light is scattered at the projection portions, and wherein the scattered light propagates in a direction different from the illumination direction and is detected by said detector.

18. An apparatus according to claim 2, wherein said optical element is a hologram.

19. An apparatus according to claim 2, wherein said optical element is a prism.

20. A detector apparatus comprising:
a transparent base having a contact portion;
means, located adjacent to a first side surface of said transparent base, for illuminating said transparent base with light;
means, formed adjacent to a second side surface of said transparent base opposite the first side surface, for guiding the light from said means for illuminating to said contact portion of said transparent base, the light beam being totally reflected from portions of said contact portion;
means, located on a bottom surface of said transparent base and adjacent to the first surface side of said transparent base, for focusing the totally reflected light from said contact portion and for outputting the focused light; and
detector means, located adjacent said focusing means, for receiving the focused light and detecting an object on said contact portion.

21. A detection apparatus comprising:
a transparent base having a contact portion formed on a top surface, said contact portion including projection portions;
means, located adjacent a side surface of said transparent base, for illuminating said contact portion of said transparent base with light and totally reflecting the light from said projection portions of said contact portion;
means, formed on said transparent base, for guiding the totally reflected light from said means for illuminating said contact portion of said transparent base;
means, formed on said transparent base, for focusing the totally reflected light from said projection portions of said contact portion and for outputting the focused light; and
detector means, located adjacent to said focusing means, for receiving the focused light and detecting an object on said contact portion.

22. A detection apparatus according to claim 21, wherein said means for illuminating is located adjacent a surface of said transparent base on which said means for focusing is located.

23. A detection apparatus according to claim 22, wherein said means for guiding the light from said means for illuminating said contact portion is located on a side surface of said transparent base opposite said means for illuminating and adjacent to said contact portion of said transparent base.

24. A detection apparatus according to claim 21, wherein said means for guiding the light from said means for illuminating said contact portion is located on a bottom surface of said transparent base opposite the top surface on which said contact portion is formed.

25. A detection apparatus according to claim 24, wherein said means for illuminating is located adjacent a side surface of said transparent base closest to said means for guiding the light and opposite said detector means.

26. A detection apparatus according to claim 21, wherein said means for illuminating is an LED.

27. A detection apparatus according to claim 21, wherein said means for guiding the light is a Lippmann hologram.

28. A detection apparatus according to claim 21, wherein said means for focusing is a hologram.

29. A bio-detection optical system comprising:
a base having a contact portiin formed thereon;
means, located on one side of the contact portion, for detecting light having a short wavelength and outputting an output voltage; and
means, located on the other side of said contact portion and opposite said means for detecting light having a short wavelength, for detecting light having a long wavelength and outputting an output voltage.

30. A bio-detection optical system according to claim 29, wherein said means for detecting light having a short wavelength and said means for detecting light having a long wavelength are capable of moving in a direction orthogonal to said contact portion, and each of said means comprising:
a photosensor; and
a light emitting diode located adjacent to said photosensor.

31. A bio-detection optical system according to claim 30, further comprising:
means, operatively connected to said means for detecting light having a long wavelength, for generating a reference voltage in response to the output voltage from said means for detecting light have a long wavelength;
means, operatively connected to said means for generating a reference voltage and said means for detecting light having a short wavelength, for comparing the reference voltage with the output voltage from said means for detecting light having a short wavelength.

32. A bio-detection optical system according to claim 31, wherein said comparing means comprises:
a bio-discrimination comparator operatively connected to said means for generating a reference voltage; and
a contact detection comparator, operatively connected to said means for generating a reference voltage, for detecting when said means for detecting light having a long wavelength contacts the object on said contact portion.

33. A bio-detection optical system according to claim 32, wherein said means for detecting light having a short wavelength detects light having a wavelength within a range of 440 nm to 580 nm, and wherein said means for detecting light having a long wavelength detects light having a wavelength longer than 630 nm.

* * * * *

UNITED STATES PATENT AND TRADEMARK OFFICE
CERTIFICATE OF CORRECTION

PATENT NO. : 4,728,186

DATED : March 1, 1988

INVENTOR(S) : SHIN EGUCHI ET AL.

It is certified that error appears in the above-identified patent and that said Letters Patent is hereby corrected as shown below:

Column 8, line 14, "arranged," should be --arranged--;
line 32, "Fig" should be --Figs--.

Column 9, line 65, after "approximately" insert --equal--.

Column 12, line 32, "contsct" should be --contact--;
line 37, "1" (both occurrences) should be --$\ell$--
line 64, "1" should be --$\ell$--.

Column 24, line 21, "portiin" should be --portion--.

Signed and Sealed this

Twenty-third Day of August, 1988

Attest:

DONALD J. QUIGG

*Attesting Officer*      *Commissioner of Patents and Trademarks*